(12) United States Patent
Bennati et al.

(10) Patent No.: US 11,317,247 B1
(45) Date of Patent: Apr. 26, 2022

(54) METHOD, APPARATUS, AND SYSTEM FOR DATA-DRIVEN EVALUATION OF HEURISTICS FOR TRAJECTORY CROPPING

(71) Applicant: HERE Global B.V., Eindhoven (NL)

(72) Inventors: Stefano Bennati, Zürich (CH); Gavin Brown, Berlin (DE); Ori Dov, Berlin (DE); Elena Vidyakina, Berlin (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 17/131,178

(22) Filed: Dec. 22, 2020

(51) Int. Cl.
*H04W 24/00* (2009.01)
*H04W 4/029* (2018.01)
*H04W 12/02* (2009.01)

(52) U.S. Cl.
CPC .......... *H04W 4/029* (2018.02); *H04W 12/02* (2013.01)

(58) Field of Classification Search
CPC .............................. H04W 4/029; H04W 12/02
See application file for complete search history.

(56) References Cited

U.S. PATENT DOCUMENTS

| | | |
|---|---|---|
| 9,122,702 B2 | 9/2015 | Biswas et al. |
| 10,664,616 B2 | 5/2020 | Herlocker et al. |
| 2013/0261954 A1* | 10/2013 | Boschker ............... G01C 21/00 701/410 |
| 2020/0068350 A1* | 2/2020 | Chai ....................... G06N 20/00 |
| 2021/0383022 A1* | 12/2021 | Bennati ................. G06F 16/285 |

OTHER PUBLICATIONS

Brush et al., "Exploring end user preferences for location obfuscation, location-based services, and the value of ocation", published in UbiComp '10: Proceedings of the 12th ACM international conference on Ubiquitous computing, Sep. 2010, 10 pages.

\* cited by examiner

*Primary Examiner* — Erika A Washington
(74) *Attorney, Agent, or Firm* — Ditthavong, Steiner & Mlotkowski

(57) ABSTRACT

An approach is disclosed for a data-driven evaluation of heuristics for trajectory cropping. The approach involves, e.g., determining a cropping heuristic, wherein the cropping heuristic comprises an algorithm for cropping a probe trajectory collected from one or more sensors of a mobile device to anonymize the probe trajectory data. The approach also involves processing the probe trajectory using the cropping heuristic to generate a cropped probe trajectory. The approach further involves extracting one or more heuristic-based features of the cropped probe trajectory data. The approach also involves extracting one or more privacy-based features from a privacy preference, wherein the one or more privacy-based features represent a target level of cropping to meet the privacy preference. The approach further involves computing a score based on a distance between the one or more heuristic-based features and the one or more privacy-based features. The approach further involves providing the score as an output.

20 Claims, 11 Drawing Sheets

100

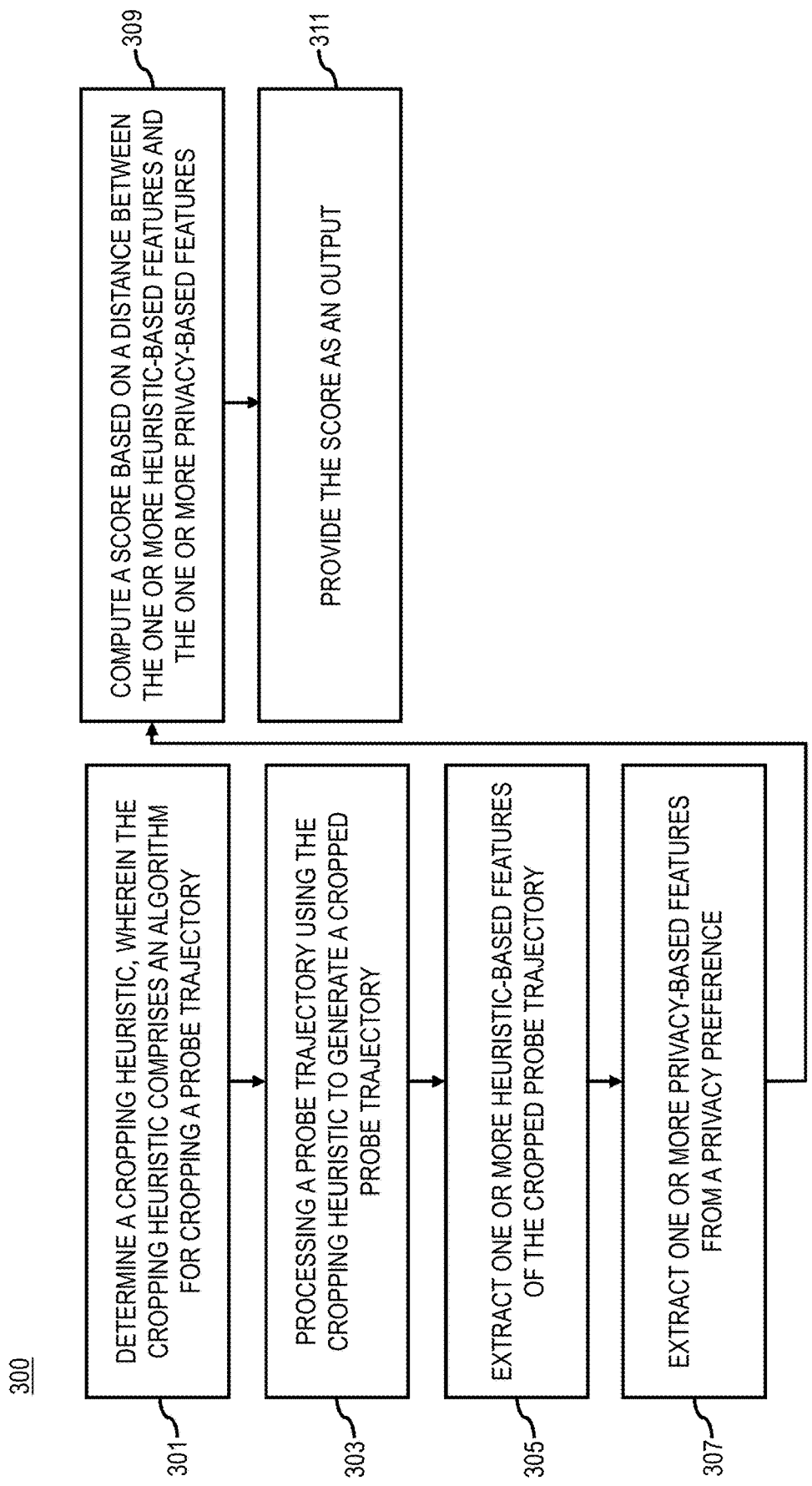

METHOD, APPARATUS, AND SYSTEM FOR DATA-DRIVEN EVALUATION OF HEURISTICS FOR TRAJECTORY CROPPING

BACKGROUND

Location-based service providers (e.g., mapping and navigation providers) are continually challenged to provide compelling services and applications. One area of development relates to providing consumers relevant location-based services (LBS) (e.g., real-time traffic information, fleet management, navigation, etc.) based on an analysis of the trajectory data that users of such services provide. The relevancy of a LBS to a user is often dependent on the accuracy of the provided trajectory data (e.g., in terms of precision, timeliness, etc.). However, sharing or providing highly accurate trajectory data can reveal sensitive information about a user (e.g., a user's habits, travel routes, personal information such as a home address, etc.) and, therefore, many users do not want to provide such information without some form of privacy protection. Accordingly, service providers face significant technical challenges to have access to accurate trajectory data while also protecting user privacy preferences.

SOME EXAMPLE EMBODIMENTS

Therefore, there is a need for having access to accurate trajectory data while also protecting user privacy preferences.

According to one embodiment, a method comprises determining a cropping heuristic, wherein the cropping heuristic comprises an algorithm for cropping a probe trajectory collected from one or more sensors of a mobile device to anonymize the probe trajectory data. The method also comprises processing the probe trajectory using the cropping heuristic to generate a cropped probe trajectory. The method further comprises extracting one or more heuristic-based features of the cropped probe trajectory data, wherein the one or more heuristic-based features represent an achieved cropping of the probe trajectory data resulting from the cropping heuristic. The method also comprises extracting one or more privacy-based features from a privacy preference, wherein the one or more privacy-based features represent a target level of cropping to meet the privacy preference. The method further comprises computing a score based on a distance between the one or more heuristic-based features and the one or more privacy-based features. The method further comprises providing the score as an output.

According to another embodiment, an apparatus comprises at least one processor, and at least one memory including computer program code for one or more computer programs, the at least one memory and the computer program code configured to, with the at least one processor, cause, at least in part, the apparatus to receive a request to initiate a transmission of real-time probe trajectory data. The apparatus is also caused to determine a privacy preference associated with the probe trajectory data. The apparatus is further caused to select a cropping heuristic based on a score associated with the cropping metric, wherein the score represents a capability of the cropping metric to achieve a target cropping level to meet the privacy preference. The apparatus is also caused to determine a start parameter for initiating the transmission based on the cropping heuristic. The apparatus is further caused to initiate the transmission of the real-time probe trajectory data based on the start parameter.

According to another embodiment, a non-transitory computer-readable storage medium having stored thereon one or more program instructions which, when executed by one or more processors, cause, at least in part, an apparatus to receive a request to initiate a transmission of a probe trajectory from a mobile device. The apparatus is also caused to determine a privacy preference associated with the mobile device, a user of the mobile device, the probe trajectory, or a combination thereof. The apparatus is further caused to select a cropping heuristic based on a score associated with the cropping metric, wherein the score represents a capability of the cropping metric to achieve a target cropping level to meet the privacy preference. The apparatus is also caused to determine a start parameter, an end parameter, or a combination thereof for initiating the transmission based on the cropping heuristic. The apparatus is further caused to initiate the transmission of the probe trajectory based on the start parameter, the end parameter, or a combination thereof.

According to another embodiment, an apparatus comprises means for determining a cropping heuristic, wherein the cropping heuristic comprises an algorithm for cropping a probe trajectory collected from one or more sensors of a mobile device to anonymize the probe trajectory data. The apparatus also comprises means for processing the probe trajectory using the cropping heuristic to generate a cropped probe trajectory. The apparatus further comprises means for extracting one or more heuristic-based features of the cropped probe trajectory data, wherein the one or more heuristic-based features represent an achieved cropping of the probe trajectory data resulting from the cropping heuristic. The apparatus also comprises means for extracting one or more privacy-based features from a privacy preference, wherein the one or more privacy-based features represent a target level of cropping to meet the privacy preference. The apparatus further comprises means for computing a score based on a distance between the one or more heuristic-based features and the one or more privacy-based features. The apparatus further comprises means for providing the score as an output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3 is a flowchart of a process for a data-driven evaluation of heuristics for trajectory cropping, according to example embodiment(s);

DESCRIPTION OF SOME EMBODIMENTS

Examples of a method, apparatus, and computer program for evaluating heuristics for trajectory cropping are disclosed. In the following description, for the purposes of explanation, numerous specific details are set forth to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form to avoid unnecessarily obscuring the embodiments of the invention.

Figure 1:
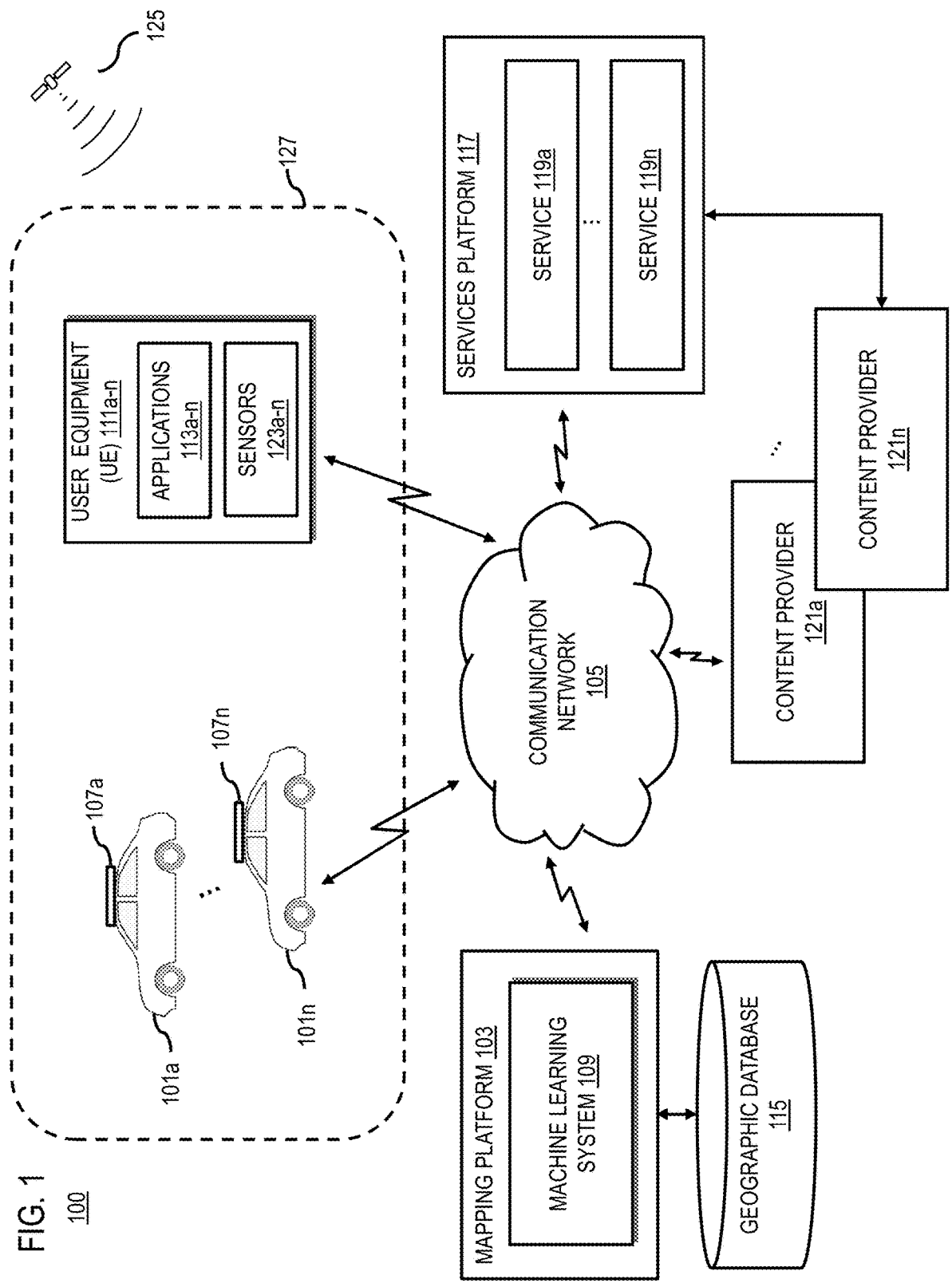
FIG. 1 is a diagram of a system capable of evaluating heuristics for trajectory cropping, according to example embodiment(s)

FIG. 1 is a diagram of a system capable of evaluating heuristics for trajectory cropping, according to example embodiment(s). As described above, LBS providers (e.g., mapping and navigation providers) are continually challenged to provide compelling services and applications. One area of development relates to providing users (e.g., consumers) contextually relevant LBS (e.g., real-time traffic information, fleet management, navigation, etc.) based on an analysis of the trajectory data (e.g., probe data) that users of such services provide.

In one instance, trajectory data can be defined as a set of data points, each of which is composed by latitude, longitude, and a timestamp. Additional information, for example, can also be associated with a data point, such as speed and heading. If a trajectory ID is associated with each point (e.g., a probe ID), the trajectory data can be partitioned in a set of trajectories, each of which identifies the movement of a user over time.

The relevancy of a LBS to a user is often dependent on the accuracy of the user derived or provided trajectory data (e.g., in terms of precision, timeliness, etc.). However, sharing or providing highly accurate trajectory data can reveal sensitive information about a user (e.g., a user's habits, travel routes, personal information such as a home address, etc.) and, therefore, many users do not want to provide such information without some form of privacy protection. In addition, different users might perceive the privacy of the same trajectory differently (e.g., due to different knowledge of the environment). Further, a user's own privacy preferences may change depending on a given context.

In one instance, trajectory data can be associated with an accuracy value and a privacy value. The accuracy value, for example, can be derived from the intrinsic value of data towards the generation of a LBS and the privacy value, for example, can reflect the sensitive information that the trajectory data can reveal about a user's habit, behaviors, personal information (e.g., home address), etc. For example, a trajectory can reveal (e.g., to a third party, a municipality, an advertiser, etc.) the user's behavioral patterns (e.g., going from point A to point B) and can potentially reveal privacy-sensitive locations (e.g., a home address, an office, etc.).

Typically, LBS providers want as much as access to as much trajectory data as possible to maximize the accuracy of the provided LBS (e.g., in terms of precision, timeliness, etc.), while at the same time minimizing the associated risks for the privacy of respective users (e.g., due to inadvertent disclosure or misuse of data) to promote a positive user experience and/or to promote continued user interest in such services. One way that LBS providers can reduce such risks to privacy is by applying privacy-enhancing algorithms to the user provided data. For example, privacy-enhancing algorithms typically work by deleting parts of the data (e.g., cropping the trajectory). In one instance, cropping the trajectory means removing the initial and final sections of the trajectory to introduce uncertainty about the actual origin and destination of the trajectory. In examples where the trajectory contains one or more intermediate sensitive points (e.g., an individual going to a hospital), the privacy-enhancing algorithm (e.g., cropping) can also be applied to the end points of one or more sub-trajectories (e.g., an origin and a destination).

Algorithms for trajectory cropping usually decide where to crop a trajectory based on heuristics that consider features of the trajectory (e.g., a time from a start, a distance from the start, etc.), one or more map features (e.g., junctions, points of interest (POIs), intersections, traffic signs, etc.), or a combination thereof from the start of the finish. By way of example, the points of interest (POIs) may include one or more potentially private and/or privacy sensitive locations such as a house, an office, a hospital, etc. Because the potential number of heuristics can be relatively large, a process is needed by which to score a heuristic and then select the most appropriate one given one or more requirements. For example, the one or more requirements may be based on a value or a cost definition. In one instance, the value may be based on the user associated value of disclosing a probe point and the cost may be based on a computational cost or privacy cost (e.g., what users of the service consider private and/or sensitive).

A service provider can determine where to crop a trajectory by adopting a constant temporal threshold (e.g., deleting data until 2 minutes after the start) or a speed threshold (e.g., deleting data until after the vehicle reaches a given speed). However, these static approaches can perform poorly with respect to edge cases, for example:

Exiting a parking lot into a congested road, as a slow-moving vehicle would not get far from the parking lot within the temporal threshold;

Exiting a parking lot into a high-speed road, as a vehicle would quickly reach a speed greater than the speed threshold; and Leaving a farm in a rural area, where the population density is much lower than in a city and, therefore, uncertainty about the actual origin of the trajectory would be much lower than desired (e.g., if the road segment where the trajectory starts leads to only a handful of homes).

In contrast to a static approach, a dynamic approach can combine multiple features of a trajectory or it can be based on one or more features of a map (e.g., a POI density, a number of junctions, etc. from a start), which can improve upon a static approach; however, the results of a dynamic approach may not necessarily align with what users consider a sufficient level of privacy. Accordingly, service providers face significant technical challenges to have access to rich trajectory data while also protecting user privacy preferences.

To address these technical problems, a system 100 of FIG. 1 introduces a capability to perform a data-driven evaluation of heuristics for trajectory cropping, according to example embodiment(s). In one embodiment, the system 100 can construct a framework to compare different heuristics for trajectory cropping and to choose one heuristic over another based on multiple characteristics like computational cost, utility of input data (e.g., accuracy), alignment with user-defined privacy preferences, etc.

In one embodiment, the system 100 can construct the framework based on one or more of the following inputs provided by way of illustration and not limitation:

a set of heuristics to choose from (e.g., crop the trajectory after the speed of a vehicle goes above 30 kilometers per hour (km/h), crop the trajectory after 500 meters (m) from the start, crop the trajectory after 3 similar map features (e.g., junctions, POIs, traffic signals, etc.) from the start, etc.);

user-defined privacy preferences which describe the mental heuristic used to define privacy risk. There preferences can either be in a raw form (e.g., answers to a questionnaire) or in a form that makes them directly applicable to an anonymization heuristic (e.g., parameter values). Anything in between may be acceptable, but would first need to be sufficiently processed by the system 100 to obtain preferences in a form that is directly applicable on the anonymization heuristic (i.e., this might include interpretation and interpolation to translate user-defined features into features that are usable in the algorithm); and a scoring function that defines the similarity between the user preferences and the output of a heuristic.

In one instance, the system 100, based on the set of heuristics, the user-defined privacy preferences; and the scoring function, can produce as an output a ranking of the heuristics based on how close they are to the respective mental heuristics obtained from the users. In other words, the system 100 can tune the algorithms to reflect the privacy preferences of the users such that the anonymization heuristic in the algorithm is relatively aligned with the respective privacy expectations of the users.

In one embodiment, the system 100 of FIG. 1 may include one or more vehicles 101*a*-101*n* (also collectively or individually referred to as vehicles 101 or a vehicle 101, respectively) (e.g., a standard vehicle, an autonomous vehicle, a heavily or highly assisted driving (HAD) vehicle, a semi-autonomous vehicle, etc.), the vehicles 101 having connectivity to a mapping platform 103 via the communication network 105. In one embodiment, the vehicles 101 include one or more vehicle sensors 107*a*-107*n* (also collectively referred to as vehicle sensors 107) (e.g., global positioning system (GPS) sensors, positioning sensors, etc.) that can enable the system 100 to collect and/or receive information or data regarding a vehicle 101's behavior in the form of trajectory data (e.g., probe data). In one instance, the probe data may be reported as probe points, which are individual data record collected at a point in time that records telemetry data for that point in time. A probe point can include attributes such as: (1) probe ID, (2) longitude, (3) latitude, (4) heading, (5) speed, and (6) time.

In one embodiment (on-line scenario), the vehicles 101 can transmit the trajectory data (e.g., probe data) in real-time or substantially real-time to the system 100, hence the vehicles 101 must decide when to start transmitting such information. In one instance, the actual end of a trajectory cannot be known with certainty in advance. For example, even in the case of guided navigation, a driver may arbitrarily or suddenly stop at a different location relative to where the guidance is aiming or suggesting. In this scenario, determining where to crop the end of the trajectories can pose a challenge for the system 100. In another embodiment (off-line scenario), the vehicles 101 transmit the data after the trajectory is completed, and the cropping of both the start and the end can be done either before transmission to the system 100 or after the data is received by the system 100.

In both cases, the system 100 needs to use a cropping heuristic or solution (e.g., an intermediate solution, approximation, short-term goal, etc.) to determine when or where the vehicles 101 should start/stop transmission of the respective trajectory data. In one instance, the value of a given heuristic can be computed by the system 100 (e.g., using additional heuristics, rules, the machine learning system 109, etc.) using several criteria (e.g., computational cost, utility, privacy, etc.) In one instance, privacy is a subjective criterion that should incorporate what users perceive to be privacy sensitive (e.g., a home address, a child's school, etc.).

In one embodiment, the system 100 can compare and select the most appropriate heuristic among a candidate set of heuristic (e.g., a heuristic above a threshold, a rank, a score, etc.) based on the following framework consisting of 4 components provided by way of illustration and not as a limitation:

A process to elicit privacy preferences from users;
A set of heuristics to be evaluated;
A method to extract features from a map (e.g., a digital map) that are needed by the heuristics; and
A scoring function to relate the heuristics to the privacy preferences.

In one embodiment, the system 100 can evaluate one or more anonymization algorithms to elicit privacy preferences from users based on both objective and subjective criteria. In terms of user trajectory cropping, subjective criteria can play a crucial role as the sensitive information that must be protected are personal locations such as a user's home address, work address, children's school, etc. Failure to determine and/or consider subjective criteria may lead to the loss of user trust.

Users (e.g., individuals) often use some kind of mental heuristic to determine what level of anonymization is sufficiently private, but these heuristics may vary across individuals and may not be entirely based on measurable criteria so it is unlikely that the system 100 can implement such heuristics directly into an anonymization algorithm. Additionally, different users might perceive privacy of the same trajectory differently due to, for example, different knowledge of an environment. It is also problematic from a privacy perspective to ask a user to evaluate another user's trajectory, as that might reveal sensitive information about the user associated with the provided trajectory. In one embodiment, given these requirements, the system 100 can tune cropping heuristics (e.g., based on objective features that can be implemented) to resemble as much as possible the respective mental heuristics of users (e.g., using the machine learning system 109).

In one embodiment, the system 100 can align (e.g., iteratively) an anonymization heuristic with subjective criteria by asking each user to label their trajectories (e.g., define one or more points in the trajectory that determine different degrees of privacy). In one embodiment, the system 100 may include one or more user equipment (UE) 111a-111n (also collectively or individual referred to herein as UEs 111 or a UE 111, respectively) (e.g., a mobile device, a smartphone, etc.), the UEs 111 having connectivity to the mapping platform 103 via the communication network 105 and including one or more applications 113a-113n (also collectively referred to herein as applications 113) (e.g., a data entry application, a navigation application, a mapping application, etc.). For example, users might be asked to define a "required cropping" point (e.g., via a mapping/navigation application 113), where the trajectory must be cropped (i.e., any point before/after the point is too privacy revealing). In one instance, the users might be asked to define a "desired cropping" point (e.g., using a mapping/navigation application 113) (i.e., where they would be most comfortable with the trajectory being cropped by the system 100).

In one instance, rather than requiring each user to label every trajectory (e.g., using a navigation application 113), the system 100 can determine or collect these labels from a user study (e.g., an interactive experiment or a questionnaire) where users are presented (e.g., via an application 113) with a visualization of an example trajectory (e.g., embedded in a map including some relevant features) and asked to perform one or more tasks provided by way of illustration and not as a limitation:

Define the point where the trajectory must/should be cropped;
Elaborate on what features influenced your decision. In other words, the user feels a trajectory is enough private if it is cropped after (e.g., the car crossed N map features (e.g., junctions), or M other vehicles);
What features a desirable cropping algorithm would operate on;
Define "silent areas" around your home where data about you should never be transmitted based on features of the map or of the trajectory (e.g., a radius of X meters from the home).

Alternatively, in one instance, where the set of available features are determined by the system 100 in advance (e.g., because of operability constraints), but their respective importance for users are not known, the system 100 can present users a questionnaire (e.g., via an application 113) containing questions such as the following:

Rank the features in this set on their impact on your perception of privacy;
Given a cropping algorithm that operates on some features, provide a desirable value for these features where to crop (e.g., distance from the start, minimum speed, a number of map features (e.g., POIs, junctions, etc.) from the start, where the trajectory should be cropped, etc.);
Given a certain scenario (e.g., a rural vs. an urban residential area) provide a desirable value for these features where a cropping algorithm should crop.

In one embodiment, the system 100 can determine objective features of a map and/or of the trajectory that describe a user's respective mental heuristic based on the answers to such questions and the answers then can be used by the system 100 (e.g., using the machine learning system 109) to implement/tune the cropping heuristics.

In one embodiment, with respect to feature extraction, the system 100 can determine the one or more features that might be required to be extracted from a map (e.g., a digital map) such as a speed of a vehicle 101, a route taken by the vehicle 101, etc. based on the heuristics that are determined by the system 100 for evaluation (e.g., from among a set of candidate heuristics).

In one instance, the system 100 can determine or select one or more a heuristics from among one or more candidate heuristics, for example, stored in or accessible via the geographic database 115, the services platform 117 (e.g., an OEM platform) including one or more services 119a-119n (also collectively referred to herein as services 119) (e.g., mapping services 119), one or more content providers 121a-121n (also collectively referred to herein as content providers 121) (e.g., software developers), or a combination thereof.

In one embodiment, the system 100 can determine or derive one or more heuristics from one or more user preferences. For example, the system 100 can build a set of heuristics around the features obtained from the users (e.g., via a UE 111) by asking them to explain their reasoning in connection with one or more privacy sensitivity determinations. For example, users may reveal (e.g., using an application 113) that the most important conditions for a cropped trajectory to be private is that it starts on a busy road; hence, road class and vehicle speed could be features that determine whether a road is determined by the system 100 to be busy or not. In one instance, given these features, the system 100 can define a set of heuristics that are based on these features (e.g., crop all the Functional Classification (FC) 1 roads and all the FC 2 roads where the speed is larger than X km/h). In one instance, the system 100 can determine the FC of one or more roads of a given area as defined by the United States Federal Highway Administration (FHWA) and/or other equivalents based on information or data stored in or accessed via the geographic database 115. For example, under the FHWA or similar functional classification system, the classifications are as follows: FC1=principal arterial roadways; FC2=minor arterial roadways; FC3=collector roadways; FC4=local roads; and FC5=minor local roads, etc.

In one instance, the system 100 can relate a respective output with the user-provided labels (e.g., stored in or accessible via the geographic database 115) to evaluate the one or more heuristics (i.e., score the heuristic). In one embodiment, the system 100 can score a heuristic by determining the "distance" between the output of the anonymization algorithm and the "desired output" provided by the user-generated labels. In one instance, the system 100 can determine a function that might, for example, assign a positive value to any point between the required and the desired cropping, a negative value to all points before the required cropping and after the desired cropping, or a combination thereof. In another instance, the system 100 can determine a function that might, for example, instead assign a positive score to points outside the range required-desired cropping, which decreases gradually the further away from these points. The scoring function can be used, for example, by the system 100 to determine which heuristic in a set produces an output that is the closest to the user-generated labels, which can then be used by the system 100, together with other scores like utility and computational cost, to determine or select which heuristic to implement. As such, the system 100 can tune the anonymization algorithms to access accurate user trajectory data while protecting the respective the privacy preferences of the users that provided the data.

Figure 2:
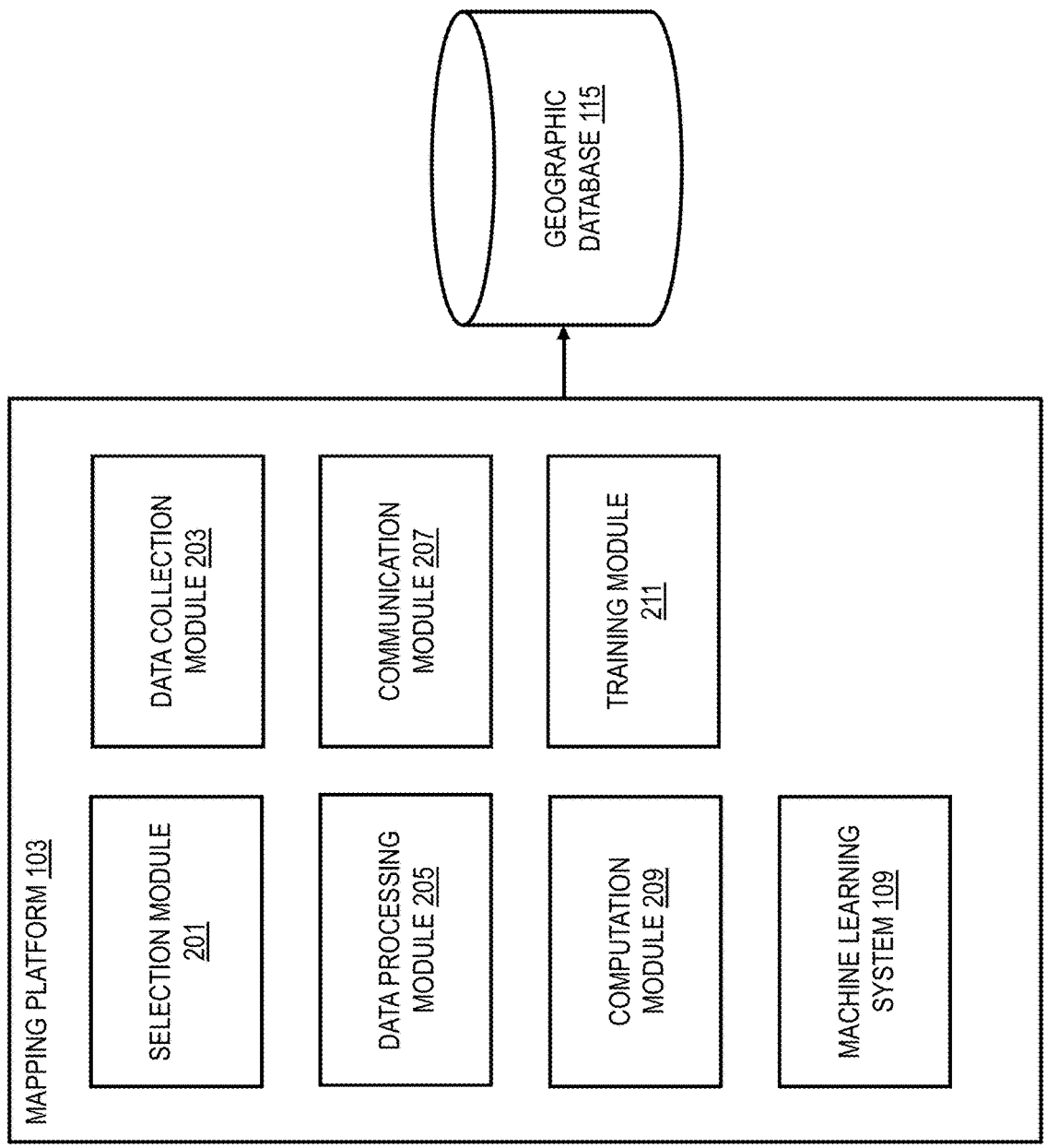
FIG. 2 is a diagram of the components of a mapping platform capable of evaluating heuristics for trajectory cropping, according to example embodiment(s)

FIG. 2 is a diagram of the components of a mapping platform, according to example embodiment(s). By way of example, the mapping platform 103 includes one or more components capable of a data-driven evaluation of heuristics for trajectory cropping, according to the example embodiment(s) described herein. It is contemplated that the functions of these components may be combined or performed by other components of equivalent functionality. In one embodiment, the mapping platform 103 includes a selection module 201, a data collection module 203, a data processing module 205, a communication module 207, a computation module 209, a training module 211, and the machine learning system 109, and has connectivity to the geographic database 115. The above presented modules and components of the mapping platform 103 can be implemented in hardware, firmware, software, or a combination thereof. Though depicted as a separate entity in FIG. 1, it is contemplated that the mapping platform 103 may be implemented as a module of any other component of the system 100. In another embodiment, the mapping platform 103, the machine learning system 109, and/or the modules 201-211 may be implemented as a cloud-based service, local service, native application, or combination thereof. The functions of the mapping platform 103, the machine learning system 109, and/or the modules 201-211 are discussed with respect to FIG. 3.

Figure 7:
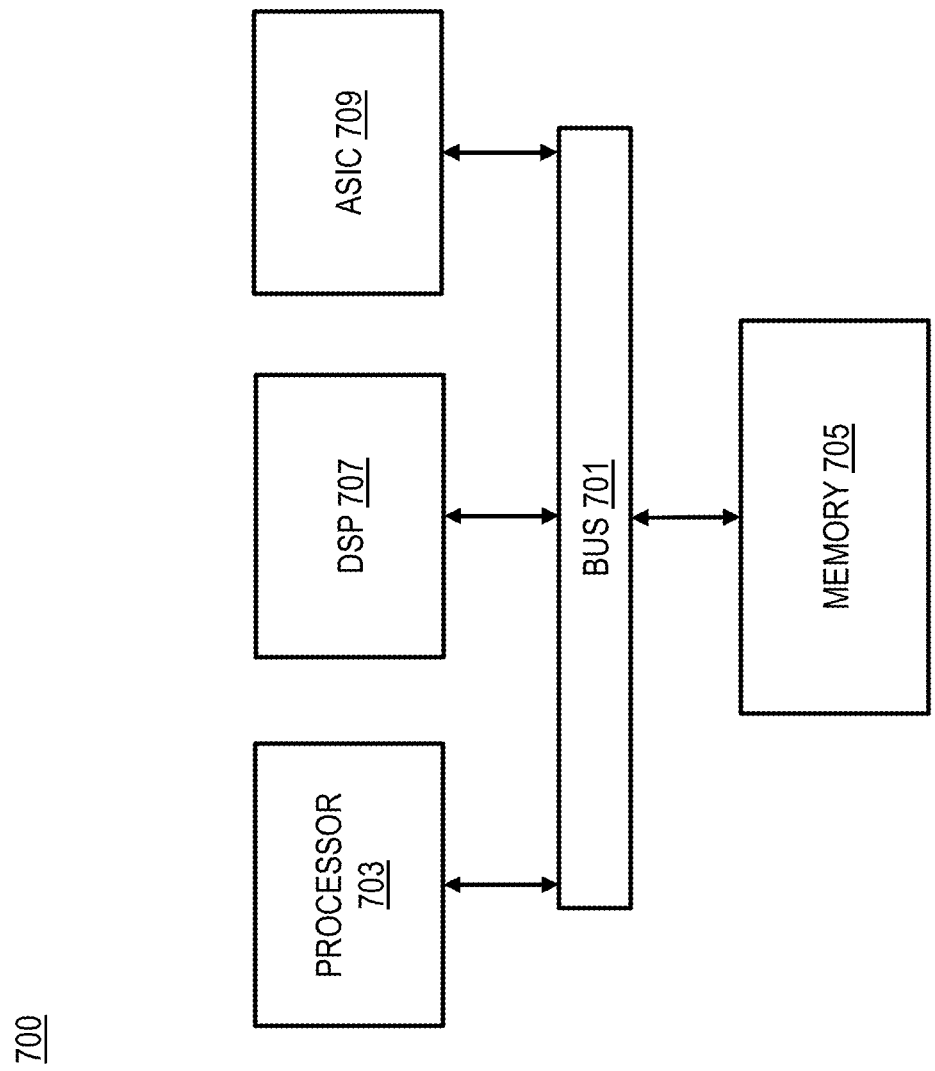
FIG. 7 is a diagram of a chip set that can be used to implement example embodiment(s)
Figure 8:
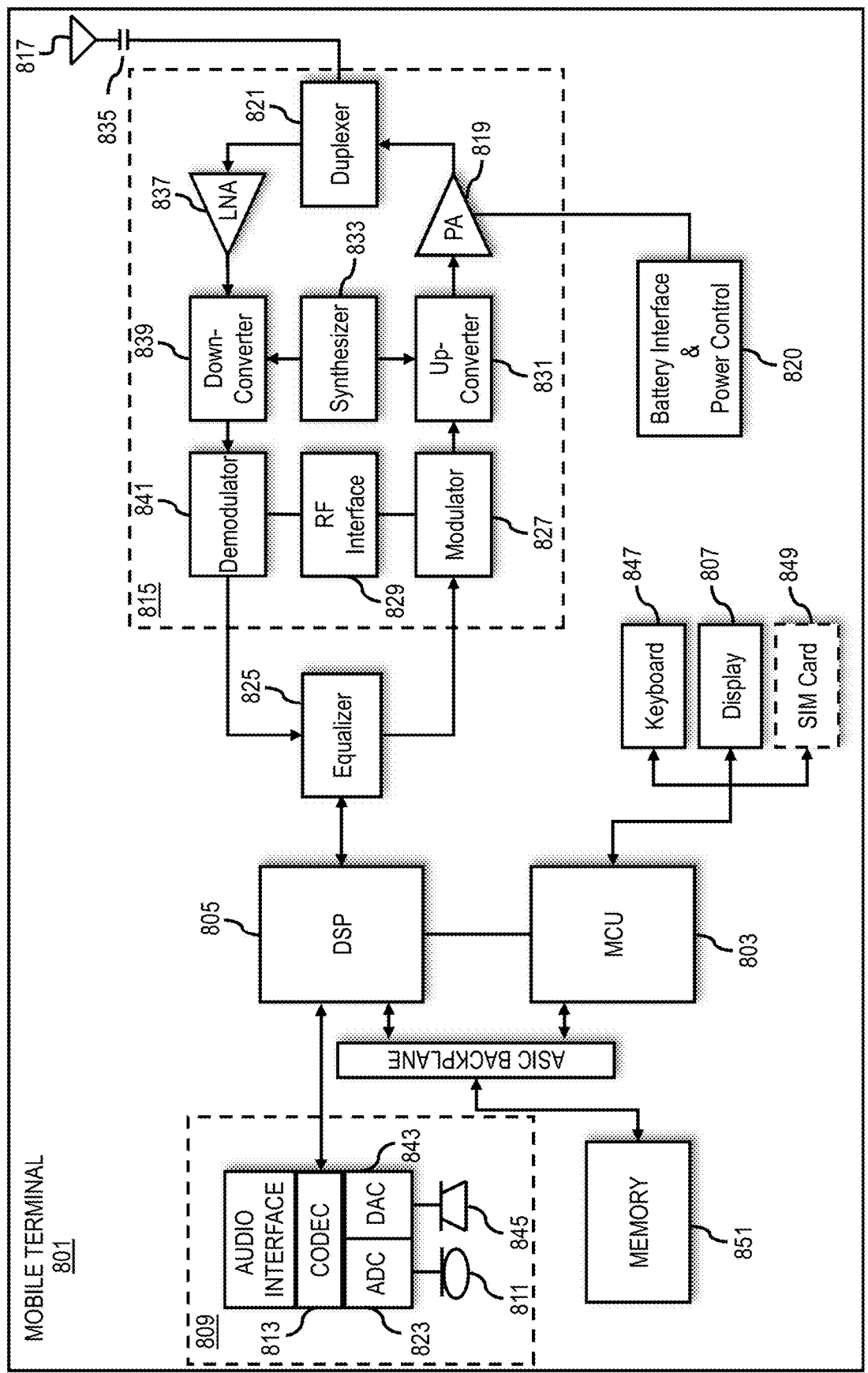
FIG. 8 is a diagram of a mobile terminal (e.g., handset or vehicle or part thereof) that can be used to implement example embodiment(s).

FIG. 3 is a flowchart of a process for evaluating heuristics for trajectory cropping, according to example embodiment(s). In various embodiments, the mapping platform 103, the machine learning system 109, and/or any of the modules 201-211 may perform one or more portions of the process 300 and may be implemented in, for instance, a chip set including a processor and a memory as shown in FIG. 7. As such, the mapping platform 103, the machine learning system 109, and/or the modules 201-211 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all the illustrated steps.

In step 301, the selection module 201 can determine a cropping heuristic, wherein the cropping heuristic comprises an algorithm for cropping a probe trajectory collected from one or more sensors of a mobile device (e.g., a UE 111) to anonymize the probe trajectory data. A probe trajectory can be, for example, a time-ordered set of probe data collected or derived from a probe device such as a UE 111, a vehicle 101, or a combination thereof (e.g., time-stamped, locations sensed, and reported by a probe device identified by a unique probe identifier). In one instance, the data collection module 203 can collect a probe trajectory from one or more device sensors 123*a*-123*n* (also collectively referred to as device sensors 123) (e.g., GPS sensors) of the UEs 111 (e.g., a mobile device, a smartphone, etc.), vehicle sensors 107 (e.g., GPS sensors), or a combination thereof.

In one instance, an algorithm (e.g., a process, a formula, a set of rules, etc.) for trajectory cropping can include where to crop a trajectory based on heuristics that consider features of the trajectory (e.g., a time from a start, a distance from a start, etc.), features of a map (e.g., junctions, POIs, street signs, stop lights, etc.), or a combination thereof. In one instance, the algorithm (e.g., stored in or accessible via the geographic database 115) can be used by the data processing module 205, the machine learning system 109, or a combination thereof to crop a probe trajectory collected by the data collection module 203.

The determining of a cropping heuristic by the selection module 201 is important, for example, because the probe trajectory data may need to be anonymized (i.e., an uncertainty is introduced as to the actual origin and destination of the probe) so that a service provider can access as much as data as possible to provide users accurate and/or contextually relevant LBS (e.g., navigation cues based on a current or upcoming location) while minimizing the associated risks for the privacy of users (e.g., related to inadvertent disclosure or misuse of data).

In step 303, the data processing module 205 can process the probe trajectory using the cropping heuristic to generate a cropped probe trajectory. In one instance, a cropped probe trajectory is a probe trajectory that has had the initial and final sections of the trajectory removed or cropped (e.g., by the data processing module 205). In one embodiment, the data processing module 205 can use the cropping heuristic to crop the probe trajectory based on a threshold speed, a threshold distance, a threshold number of one or more map features (e.g., junctions, intersections, traffic lights, street signs, homes, etc.), a threshold number of one or more POIs (e.g., businesses, venues, parks, a POI density, etc.), or a combination thereof. The cropping of the probe trajectory by the data processing module 205 is important because it can introduce uncertainty about the origin and/or the destination of the trajectory data to protect the privacy of the user that generated the trajectory data, particularly since such data can reveal generally private location information (e.g., a home, a workplace, etc.).

In one instance, the data processing module 205 can use the number of POIs to generate a cropped probe trajectory. In one instance, a relatively high number of POIs and/or a relatively high POI density (e.g., in a city center) may correspond to a relatively higher degree of privacy. For example, it may be difficult for someone to infer or deduce a private or privacy sensitive location (e.g., a house) relative to the other POIs in the area and, therefore, the cropping heuristic can crop relatively less of the trajectory. In contrast, a relatively low number of POIs and/or a relatively low POI density (e.g., in a rural area) may correspond to a relatively lower degree of privacy. For example, it may be easy for someone to infer or deduce a private or privacy sensitive location relative to the few or sparse POIs in the area and, therefore, the cropping heuristic can crop relatively more of the trajectory. In addition, the data processing module 205 can also use certain types of POIs (e.g., medical, police, nightlife, etc.) as privacy sensitive features in terms of generating the cropped probe trajectory (i.e., determining what should be cropped to ensure user privacy).

In one instance, a threshold speed may be a speed at which a vehicle 101's speed changes from a relatively slow or initial speed to a relatively moderate or normal speed (e.g., at or about 30 km/h) and/or a change of speed that is indicative of a vehicle 101 departing a location and/or arriving at a location (e.g., a home). A threshold distance, for example, may be a distance or time required for a vehicle 101, a user (e.g., a pedestrian), or a combination thereof to travel a sufficient distance away from a location such that another individual would have a relatively difficult time to determine the vehicle 101's, the user's, or a combination thereof actual origin or actual destination with a relatively high degree of specificity and/or accuracy. In one instance, a threshold number of one or more map features and/or a threshold number of one or more POIs, for example, may be a distance or time required for a vehicle 101, a user, or a combination therefore to travel a sufficient distance away from a location; however, instead of the distance being purely based on a measurement it is based on quality of features, POIs, etc. In one instance, the one or more map features may comprise a junction, an intersection, a traffic light, a street sign, a home, a POI such as a business, a venue, a park, etc. By way of example, a junction may be an intersection, a break or change of road or route classification (e.g., a FC), a break or change of road or route type or material (e.g., a parking lot to a road, a dirt road to a paved road, etc.), or a combination thereof.

In one embodiment, the data processing module 205 can determine the applicable or relevant threshold speed, the threshold distance, the threshold number of one or more map features (e.g., junctions, intersections, traffic lights, street signs, homes, etc.), the threshold number of one or more POIs (e.g., businesses, venues, parks, etc.) based on historical probe data (e.g., an average, a mean, etc.), contextual data (e.g., a location, a population density, a type of vehicle 101, etc.), temporal data (e.g., a time of day, a day of week, a weather pattern, etc.), or a combination thereof. By way of example, in a crowded city, the required threshold distance, number of map features (e.g., junctions), number of POIs, etc. to sufficiently anonymize a location may be relatively low, whereas in a sparsely populated area, the required threshold distance, number of map features (e.g., junctions), number of POIs, etc. may be relatively high. In one embodiment, the threshold speed, the threshold distance, the threshold number of one or more map features, the threshold number of one or more POIs, the historical probe data, the contextual data, the temporal data, or a combination thereof may be stored in or accessible by the data processing module 205 via the geographic database 115.

In step 305, the data collection module 203 can extract one or more heuristic-based features of the cropped probe trajectory data, wherein the one or more heuristic-based features represent an achieved cropping of the probe trajectory data resulting from the cropping heuristic. In one embodiment, depending on the cropping heuristics determined by the selection module 201, a number of features might be required (e.g., speed of the vehicle 101, the route taken by the vehicle 101, etc.) for the computation module 209 to evaluate the determined cropping heuristic. In one instance, the one or more heuristic-based features include a speed, a distance, a number of one or more map features (e.g., junctions, intersections, traffic lights, street signs, homes, etc.), a number of one or more POIs (e.g., businesses, venues, parks, etc.), or a combination thereof at a start or at an end of the cropped trajectory. In one instance, the data collection module 203 can treat the one or more map features and the number of one or more POIs similarly for the purposes of cropping the trajectory (e.g., crop trajectory until passing 10 homes from the origin, crop trajectory until passing 10 businesses from the origin, etc.). In one embodiment, the data collection module 203 can provide the one or more heuristic-based features to the data processing module 205 in connection with the cropping heuristics as required. By way of example, the extraction of the one or more heuristic-based features can be important because the features may be used in connection with the subsequent evaluation of the candidate heuristics for cropping the probe trajectory data. In addition, the extracted one or more heuristic-based features can be used by the training module 211 to train the machine learning system 109 to align the anonymization heuristic in the algorithm (e.g., iteratively) with the respective privacy expectations of users.

In step 307, the data collection module 203 can extract one or more privacy-based features from a privacy preference, wherein the one or more privacy-based features represent a target level of cropping to meet the privacy preference. As previously mentioned, anonymization algorithms can be evaluated both with objective and subjective criteria. In the case of trajectory cropping, subjective criteria can play a crucial role as the sensitive information that must be protected are personal locations such as a home address, work address, etc. In one instance, the privacy-based features comprise a target speed, a target distance, a target number of one or more map features (e.g., junctions, street signs, homes, etc.), a target number of one or more POIs (i.e., a POI density), or a combination thereof corresponding to the outer boundaries of the cropped probe trajectory (i.e., speeds, distances, map features (e.g., junctions), POIs below the respective targets are deleted or cropped from a user's probe trajectory). In one instance, user-defined privacy preferences can describe the mental heuristics used to define individual privacy risk. These preferences can either be in raw form (e.g., answers to a questionnaire) or in a form that makes them directly applicable to the anonymization heuristic (e.g., parameter values).

In one embodiment, the data collection module 203 in connection with the communication module 209 can receive a user input (e.g., via a UE 111, an application 113, or a combination thereof) that labels a reference trajectory at one or more trajectory points corresponding to different degrees of privacy, wherein the privacy preference is based on the user input. For example, users can use an application 113 (e.g., a navigation application) to define a "required cropping" point, where the trajectory must be cropped (i.e., any point before/after is too privacy revealing) and a "desired cropping" point where they would be most comfortable with the trajectory being cropped. In one instance, the target level of cropping is based on the one or more trajectory points of the reference trajectory. In one embodiment, the one or more privacy-based features include a target speed, a target distance, a target number of one or more map features, a target number of one or more POIs, or a combination thereof corresponding to the one or more trajectory points. In one instance, the target speed corresponding to the one or more trajectory points could be based on an historical average or median speed at the one or more trajectory points, one or more contextual factors (e.g., current weather, traffic, etc.), one or more temporal factors (e.g., time of day, day of week, etc.), or a combination thereof. In one embodiment, the training module 211 in connection with the data collection module 203 can provide one or more trajectory points as an input to a machine learning model (e.g., the machine learning system 109) to compute the target speed, the target distance, the target number of one or more map features, the target number of one or more POIs, or a combination thereof.

In one embodiment, extracting the one or more privacy-based features comprises parsing user privacy questionnaire data to determine the privacy preference, the one or more privacy-based features, or a combination thereof (i.e., subjective criteria). By way of example, asking users to label every trajectory might be too burdensome (e.g., possibly leading to a poor user experience) so the labeling of the one or more trajectory points can be obtained by the data collection module 203 by extracting one or more privacy-based features through user participation in a user study (e.g., an interactive experiment or questionnaire) where users can be presented (e.g., via an application 113) with a visualization of an example trajectory (e.g., embedded in a map including some relevant features) and can be asked to perform tasks like: (1) define the point where the trajectory must/should be cropped; (2) elaborate on what features influenced your decision; (3) what features would a desirable cropping algorithm operate on; or (4) define "silent areas" around your home where data about you should never been transmitted.

In step 309, the computation module 209 can compute a score based on a distance between one or more heuristic-based features and one or more privacy-based features. By way of example, in order for the data processing module 205 to evaluate heuristics, the data processing module 205 needs to be able to relate the output (e.g., the cropped probe trajectory) with the user-provided labels. For this reason, the mapping platform 103 needs a scoring function that determines the "distance" between the output of the algorithm and the "desired output" provided by the user-generated labels. In one embodiment, the distance between the one or more heuristic-based features and the one or more privacy-based features is based on a number of probe points of the cropped probe trajectory that are within the target level of cropping, outside the target level of cropping, or a combination thereof. In one instance, the computation module 209 could assign a positive value to any point between the "required cropping" point and the "desired cropping" point and assign a negative value to all points before the "required cropping" point and after the "desired cropping" point. In another example, the computation module 209 could instead assign a positive score to the points that are outside the range of required-desired cropping points, wherein the score decreases gradually the further away from these points. In one example, the score computed by the computation module 209 and the distance between the one or more heuristic-based features and the one or more privacy-based features may be inversely related such that the higher the score, the shorter the distance.

In step 311, the communication module 207 can provide the score as an output. In one instance the score, the output, or a combination thereof can be provided by the communication module 207 to a LBS provider (e.g., a service 119, a content provider 121, or a combination thereof), a data consumer (e.g., a municipality interested in traffic optimization, software developer, etc.), data producers (e.g., pedestrians, drivers, etc.), or a combination thereof. By way of example, the score can enable a LBS provider and/or a data consumer to tune the anonymization algorithm to better reflect the privacy preferences of the respective users providing the probe trajectory data. The score can also enable, for example, users and/or data producers to quantitatively determine how aligned the anonymization algorithms are with privacy preferences when selecting among various LBS (e.g., navigations applications 113). In one embodiment, the output can be a user interface (e.g., a mapping application 113) representing how aligned the cropping heuristic, the cropped probe trajectory, or a combination thereof is with the privacy expectations of the user that provided the trajectory.

In one embodiment, the selection module 201 can select the cropping heuristic from among a plurality of cropping heuristics (e.g., stored in or accessible via the geographic database 115) based on the score. In one instance, the communication module 207 can then initiate a configuration of the cropping heuristic in a device (e.g., a navigation application 113 of a mobile device, a client terminal, etc.) based on the selected cropping heuristic. In one instance, the selecting of the cropping heuristic by the selection module 201 is further based on one or more other scores representing a utility, a computation cost, or a combination thereof of the plurality of cropping heuristics. In one embodiment, the data processing module 205 can rank the cropping heuristic among the plurality of cropping heuristics based on the score, wherein the output further comprises the ranking. In other words, the scoring and/or ranking function can be used to determine which heuristic among the set produces an output that is the closest to the user-generated labels (mental heuristics) to be implement in a device (e.g., a vehicle 101, a UE 111, or a combination thereof).

In one embodiment, the training module 211 and the machine learning system 109 can select and/or tune respective weights or weighting schemes used by the data processing system 205 and/or the selection module 201 to rank and/or to select the cropping heuristic from among a plurality of cropping heuristics. In one instance, the training module 211 can continuously provide and/or update a machine learning module (e.g., a support vector machine (SVM), neural network, decision tree, etc.) of the machine learning system 109 during training using, for instance, supervised deep convolution network or equivalents. By way of example, the training module 211 can train the machine learning module using the respective weights or weighting schemes of the one or more heuristic-based features, the one or more privacy-based features, or a combination thereof to tune the selected cropping heuristic to reflect the respective privacy preferences of the users providing the probe trajectory data. In one instance, the training module 211 can train the machine learning module to enable the data processing module 205 to more efficiently consider the features of the trajectory (e.g., a time from a start, a distance from start, etc.), the features of a map (e.g., number of POIs, number of junctions, etc. from a start), or a combination thereof to generate a cropped probe trajectory aligned with or tailored to the respective privacy expectations or preferences of the users.

In one embodiment, the selection module 201 can determine a cropping heuristic to generate a cropped probe trajectory for a vehicle 101 that can transmit its behavior (e.g., probe trajectory data) based on a user privacy preference. In one instance, the vehicle 101 can transmit and/or the data collection module 203 can receive the probe trajectory data in real time (e.g., in an on-line scenario) and in another instance, the vehicle 101 can transmit and/or the data collection module 203 can receive the data after the trajectory is complete (e.g., in an off-line scenario). In one instance, the same can be true with respect to a user (e.g., a pedestrian) carrying a UE 111.

In an on-line scenario, the actual end of the trajectory, for example, may not be known by the data processing module 205 with certainty in advance. For example, even in the case of guided navigation (e.g., via a navigation application 113), a driver of a vehicle 101 or a pedestrian might stop at a different location compared to where the navigation application 113 is aiming. Consequently, a cropping heuristic is needed to decide where to start/stop a given transmission/collection.

In one embodiment, the communication module 207 in the on-line scenario can receive a request to initiate a transmission of real-time probe trajectory data. In one instance, the real-time probe trajectory data may be transmitted (e.g., via the communication network 105) from a vehicle 101 (e.g., via a vehicle sensor 107), a UE 111 (e.g., via a device sensor 123), or a combination thereof (e.g., via an embedded navigation system 111).

In one instance, the data processing module 205 can determine a privacy preference associated with the probe trajectory data. In one embodiment, each vehicle 101, UE 111, and/or application 113 may be assigned a unique probe identifier (probe ID) for use in reporting or transmitting said probe data collected by the vehicles 101 and/or UEs 111. In one instance, the data processing module 205 can compare the probe ID against a user input, user privacy questionnaire data, or a combination thereof (e.g., stored in or accessible via the geographic database 115) to determine the privacy preference associated with the probe trajectory data. Determining the privacy preference associated with the probe trajectory data is important to ensure that the cropping heuristic is relatively aligned with the user privacy expectations.

In one embodiment, the selection module 201 can select a cropping heuristic based on a score associated with a cropping metric, wherein the score represents a capability of the cropping metric to achieve a target cropping level to meet a user's privacy preference. In one instance, the selection module 201 can select the cropping heuristic from among a plurality of cropping heuristics (e.g., stored in or accessible via the geographic database 115) based on the score (e.g., selecting the cropping heuristics with the highest score).

In one instance, the data collection module 203 can determine a start parameter for initiating the transmission based on the cropping heuristic. In embodiment, the start parameter indicates a speed, a distance, a number of one or more map features (e.g., junctions, intersections, traffic lights, street signs, homes, etc.), a number of one or more POIs (e.g., businesses, venues, parks, POI density, etc.), or a combination thereof at which point the transmission is to be initiated. For example, once the data processing module 205 determines that the vehicle 101 has reached a certain speed that is no longer indicative of an origin, the vehicle 101 may initiate the transmission of real-time probe trajectory data and/or the data collection module 203 may start receiving such data for processing by the data processing module 205. In one embodiment, the data collection module 203 can extract one or more privacy-based features from the privacy preference, wherein the start parameter is determined by the data collection module 203 based on the one or more privacy-based features and wherein the one or more privacy-based features can include a target speed, a target distance, a target number of one or more map features (e.g., junctions), a target number of one or more POIs (e.g., POI density), or a combination thereof corresponding to the target level of cropping. In one instance, the target level of cropping is the target level of cropping required to meet the privacy preference of a user (e.g., the user associated with the vehicle 101 transmitting the real-time probe trajectory data). In one embodiment, the communication module 207 can then initiate the transmission of the real-time probe trajectory data based on the start parameter.

In contrast, in one embodiment, the communication module 207 in the off-line scenario can receive a request to initiate a transmission of a probe trajectory from a vehicle 101 and/or a user (e.g., a pedestrian) carrying a UE 111 (e.g., a mobile device). In this example, the vehicle 101 or the UE 111 can transmit the data after the trajectory is completed and the cropping of both the start and the end can be done either before the transmission or after the data is received by the data collection module 203. By way of example, the communication module 207 may receive the request via the communication network 105 from a vehicle sensor 107 or a UE 111 that is associated with the vehicle 101 (e.g., an embedded navigation system), a driver or a passenger of the vehicle 101, or a pedestrian. In one instance, the communication module 207 may receive the request via an application 113 (e.g., a navigation application, a mapping application, or a combination thereof).

In one embodiment, similar to the on-line scenario, the data processing module 205 in the off-line scenario can determine a privacy preference associated with a vehicle 101, a user of the vehicle 101, a user (e.g., a pedestrian), the probe trajectory, or a combination thereof. In one instance, as described above with respect to the on-line scenario, each vehicle 101, user of the vehicle 101 or pedestrian (e.g., based on a UE 111) and/or an application 113 may be assigned a unique probe identifier (probe ID) for use in reporting or transmitting said probe data collected by the vehicles 101 and/or the UEs 111. In one instance, the data processing module 205 can compare the probe ID against a user input, user privacy questionnaire data, or a combination thereof (e.g., stored in or accessible via the geographic database 115) to determine the privacy preference associated with the vehicle 101, a user of the vehicle 101 or a pedestrian, the probe trajectory, or a combination thereof. Again, determining the privacy preference associated with the vehicle 101, a user, the probe trajectory, or a combination thereof is important to ensure that the cropping heuristic is relatively aligned with the user's privacy expectations.

In one embodiment, like in the on-line scenario, the selection module 201 in the off-line scenario can select a cropping heuristic based on a score associated with a cropping metric, wherein the score represents a capability of the cropping metric to achieve a target cropping level to meet the privacy preference. In one instance, the selection module 201 can select the cropping heuristic from among a plurality of cropping heuristics (e.g., stored in or accessible via the geographic database 115) based on the score (e.g., selecting the cropping heuristics with the highest score).

In one instance, like in the on-line scenario, the data collection module 203 in the off-line scenario can determine a start parameter, an end parameter, or a combination thereof for initiating the transmission based on the cropping heuristic. In this instance, the off-line scenario differs relatively slightly from the on-line scenario in that the data collection module 203 can determine an end parameter whereas in the on-line scenario, the actual end of the probe trajectory may not be known by the data collection module 203 with certainty in advance. In one embodiment, the start parameter indicates a start speed, a start distance, a start number of one or more map features (e.g., junctions, intersections, traffic lights, street signs, homes, etc.) a start number of one or more POIs (e.g., businesses, venues, parks, a POI density, etc.), or a combination thereof at which the transmission is to be initiated (e.g., by the communication module 207) and the end parameter indicates an end speed, an end distance, an end number of one or more map features (e.g., junctions), an end number of one or more POIs (e.g., POI density), or a combination thereof at which the transmission is to be terminated.

In one instance, similar to the on-line scenario, the data collection module 203 in the off-line scenario can extract one or more privacy-based features from the privacy preference and the one or more privacy-based features can include a target speed, a target distance, a target number of one or more map features (e.g., junctions), a target number of one or more POIs (e.g., a POI density) or a combination thereof corresponding to the target level of cropping. In this instance, the off-line scenario differs relatively slightly from the on-line scenario in that the start parameter, the end parameter, or a combination thereof can be determined based on the one or more privacy-based features. In one embodiment, the communication module 207 can then initiate the transmission of the probe trajectory based on the start parameter, the end parameter, or a combination thereof.

FIGS. 4A through 4D are diagrams of example user interfaces capable of a data-driven evaluation of heuristics for trajectory cropping, according to example embodiment (s). In one use case example, a user (e.g., an individual) lives in a residential area of a relatively densely populated city and is running for a hotly contested political office. The user may want to take advantage of various LBS services (e.g., a navigation application 113) to minimize the time required to drive or ride in a vehicle 101 back and forth between her home 401 and her campaign office 403, which she understands can require accurate probe trajectory data, but also has privacy concerns and wants to avoid an inadvertent disclosure and/or misuse of such data that could lead to an unwanted disclosure of the location of either her home 401 or office 403 (e.g., for safety precautions). The same may be true in the case of a teacher or a principal of a school that may want to keep the location of her home private from students and/or their families.

Figure 4A:
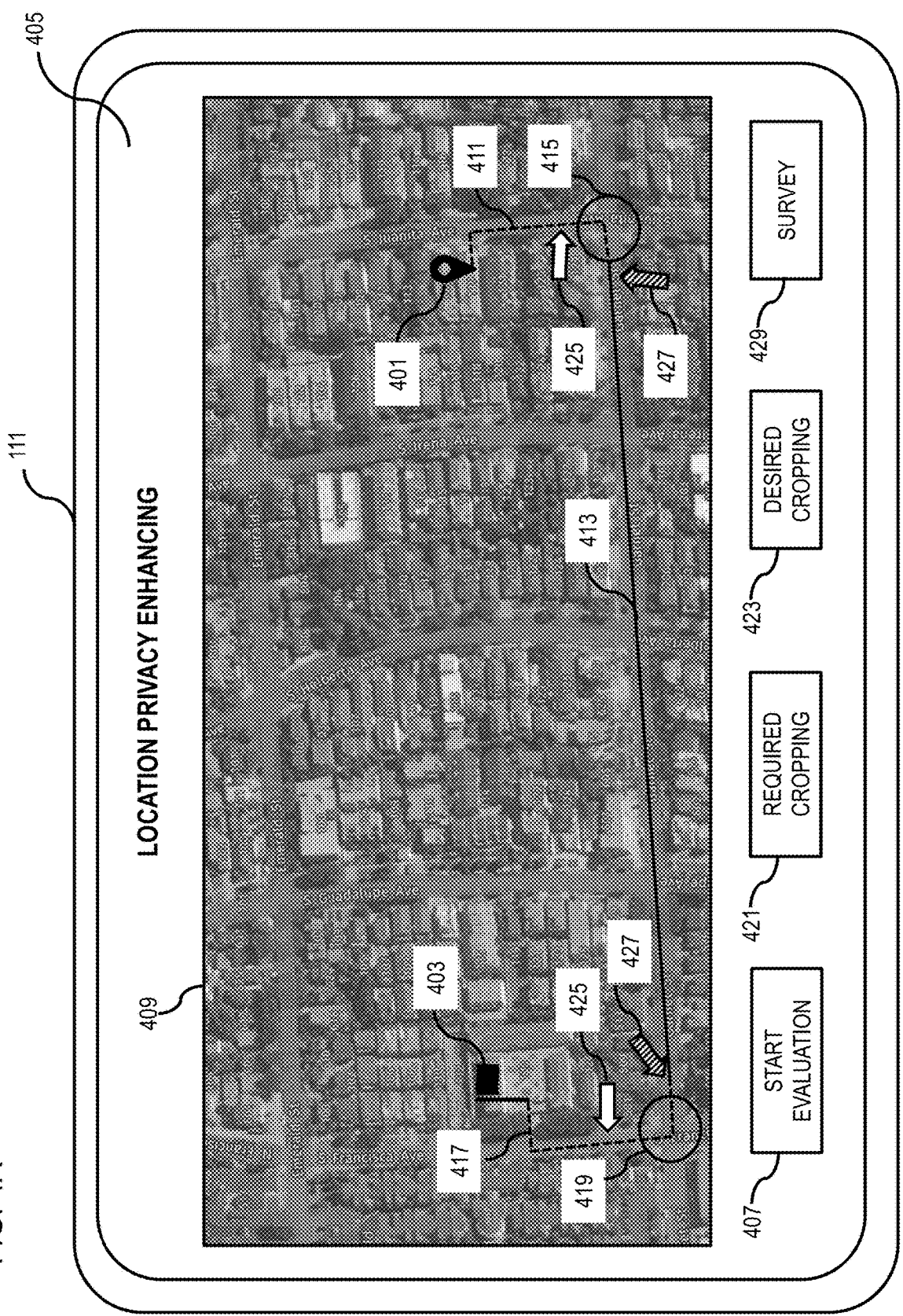
FIGS. 4A through 4D are diagrams of example user interfaces capable of evaluating heuristics for trajectory cropping, according to example embodiment(s)

In one embodiment, the system 100 can generate a user interface (UI) 405 (e.g., a navigation application 113) for a UE 111 (e.g., a mobile device, a smartphone, a client terminal, etc.) that can enable a user (e.g., an individual, a software developer, etc.) to compare different heuristics for trajectory cropping and to select the cropping heuristic that is most aligned with the user's privacy preferences. Referring to FIG. 4A ("Location Privacy Enhancing"), in one instance, the system 100 can generate the UI 405 such that it includes an input 407 (e.g., "Start Evaluation") to enable a user to start the heuristics evaluation process as described with respect to the various embodiments described herein. By way of example, the system 100 can enable the user to compare and to choose a heuristic based on an individual balancing of an accuracy value that comes from the intrinsic utility of the data towards the generating and/or or functionality of one or more LBS (e.g., a navigation application 113) and a privacy value that reflects the sensitive information that trajectory data reveals about a user's habits, behaviors, personal information, etc. In other words, the greater the LBS functionality and/or accuracy, the greater the potential risk to a user's personal privacy.

In one embodiment, based on a user interaction with the input 407, the system 100 can select a cropping heuristic (e.g., crop after a threshold speed, a threshold distance, a threshold number of one or more map features (e.g., junctions), a threshold number of POIs or POI density, etc.) from among a set of candidate heuristics (e.g., stored in or accessible via the geographic database 115) following the various embodiment described herein. In this example, the cropping heuristic of FIG. 4A may be based on a number of junctions (e.g., intersections) of the map 409 such that the system 100 deletes the probe trajectory data 411 of the probe trajectory 413 until the user and/or the user vehicle 101 travels through a first intersection (e.g., intersection 415) away from the user's home 401 and then deletes the probe trajectory data 417 once the user and/or the user vehicle 101 travels within one intersection (e.g., intersection 419) away from the user's office 403. In addition to the number of junctions or intersections, the system 100 may use a cropping heuristic that includes a threshold speed, a threshold distance, a threshold number of POIs or POI density, etc. such that the cropping heuristic of FIG. 4A can be based on more than just a constant temporal threshold.

In one instance, the system 100 can generate the UI 405 such that it includes an input 421 (e.g., "Required Cropping") and an input 423 (e.g., "Desired Cropping") to enable the user and/or the system 100 to tune or align the selected cropping heuristic based on the user's subjective privacy preferences. The "Required Cropping" points can be set, for example, by the user where the system 100 must crop the probe trajectory 413 (e.g., any point before/after that point is too privacy revealing) (i.e., the minimum amount of cropping of the probe trajectory 413 by the system 100). In return, the system 100 can have relatively more access to the user's probe trajectory data (e.g., for processing in connection with an LBS), but this selection also provides the user relatively less privacy protection. In one embodiment, the system 100 can generate the UI 405 such that it includes two inputs 425 (e.g., arrows) based on a user interaction with the input 421 (e.g., "Required Cropping"), which the user can interact with and/or manipulate to set the "Required Cropping" points. In this example, the user set the inputs 425 approximately two map features or structures (e.g., homes, buildings, etc.) away from the user's home 401 and/or office 403.

In contrast, the "Desired Cropping" points can be set, for example, by the user where the user would be relatively more comfortable with the system 100 cropping the probe trajectory 413 (i.e., the maximum amount of cropping of the probe trajectory 413 by the system 100). In return, the system 100 can have relatively less access to the user's probe trajectory data, but this selection provides the user relatively more privacy protection. In one embodiment, the system 100 can generate the UI 405 such that it includes two inputs 427 (e.g., arrows) based on a user interaction with the input 423 (e.g., "Desired Cropping"), which the user can interact with and/or or manipulate to set the "Desired Cropping" points. In this example, the user set the inputs 427 a slight distance away from the relevant cross streets or intersections 415 and 419 so if the probe trajectory 413 were to be inadvertently disclosed, for example, it would be unclear to an observer which cross streets that the user used to travel to her home 401 or office 403. This cropping heuristic can be particularly helpful in the context of a relatively crowded area where there are any number of streets that the user could use to travel to her home 401 or office 403. For example, an area with a relatively high POI density may have greater privacy in terms of someone being able to easily infer or deduce a private or privacy sensitive location (e.g., a home, doctor's office, etc.). In contrast, an area with a relatively low POI density (e.g., a rural area) may have less privacy in terms of someone being able to easily infer or deduce a private or privacy sensitive location (e.g., if there are only two homes in the area).

In one embodiment, the system 100 can generate the UI 405 such that it includes an input 429 (e.g., "Survey") that can enable the user to interact with the UI 405 to provide relevant privacy information to the system 100 rather than having to label each and every trajectory. In one instance, a user interaction with one or more inputs (e.g., inputs 407, 421, 423, 425, 427, 429, etc.) may include one or more physical interactions (e.g., a touch, a tap, a gesture, typing, etc.), one or more voice commands, or a combination thereof. In one instance, the system 100 can generate the UI 405 such that it can provide a user with one or more audio cues or audible feedback in response to one or more user interactions with the UI 405. In one embodiment, the system 100 can generate all the inputs described with respect to FIGS. 4A-4D such that they all have the same functionality in terms of user interaction/operability.

Figure 4B:
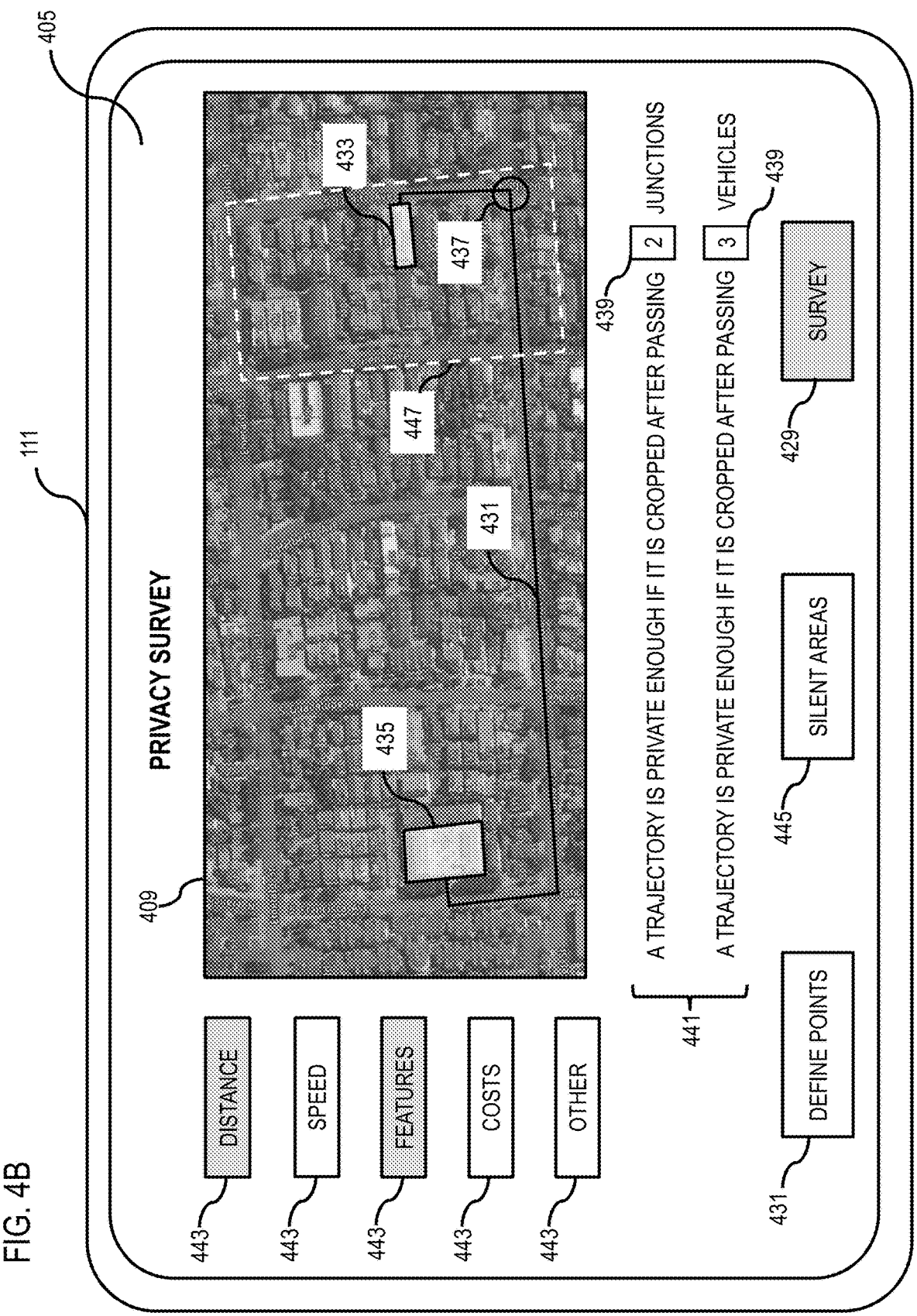

In one embodiment, the system 100 can generate the UI 405 such that it can enable a user to provide privacy preference information to the system 100 through an interactive experiment or questionnaire in addition to and/or instead of labeling each trajectory, as described with respect to FIG. 4A. Referring to FIG. 4B ("Survey"), in one embodiment, the system 100 can generate the UI 405 based on a user interaction with the input 429 (e.g., "Survey") such that a user can be presented with a visualization of an example trajectory embedded in a map (e.g., the map 409) including relevant features (e.g., a home, an office, a hospital, etc.) and the UI 405 can be used by a user to perform one or more privacy preference determining tasks. In this example, the example trajectory 431 represents the path of a vehicle 101 between a home 433 and an office, hospital, or school 435.

In one instance, the system 100 can generate the UI 405 such that it includes an input 431 (e.g., "Define Points") that can enable a user to define one or more points where the trajectory must/should be cropped (e.g., at or about the intersection 437) similar to that which was described above with respect to FIG. 4A. In one instance, the system 100 can generate the UI 405 such that it includes one or more inputs 439, which can enable a user to elaborate on one or more feature inquiries 441 generated and presented by the system 100 via the UI 405. For example, the feature inquiry 441 may include questions such as "A trajectory is private enough if it is cropped after passing N junctions" and/or "A trajectory is private enough if it is cropped after passing N vehicles." In this example, a user has inputted "2" and "3", respectively, using the inputs 439. It is contemplated that the system 100 can generate any number of feature inquiries 441 to obtain privacy preference information from a user.

In one embodiment, the system 100 can generate the UI 405 such that it includes one or more inputs 443 (e.g., "Distance," "Speed," "Features," (e.g., junctions, POIs, etc.) "Costs," "Other," etc.) which can enable a user to select one or more features that a user believes are desirable for the system 100 to use to crop a probe trajectory (e.g., the probe trajectory 431). By way of example, the "Costs" may include computation costs, utility, etc. In this example, the user selected "Distance" and "Features," as demonstrated by the highlighted inputs 443.

In one instance, the system 100 can generate the UI 405 such that it includes an input 445 (e.g., "Silent Areas") to enable a user to define an area or boundary around a relatively private location such as a home (e.g., the home 433) where data about the user should never be transmitted based on the features of the map (e.g., intersections) or a trajectory (e.g., a radius X meters (m) from the home). In one instance, a user interaction with the input 445 can enable a user to draw a boundary 447 around a location (e.g., the home 433). The boundary 447 may comprise a predefined or known polygon shape, for example, or a user may manipulate (e.g., using a finger gesture) the boundary 443 into one or more configurations based on one or more user preferences. In one instance, the system 100 can generate the UI 405 such that the input 445 (e.g., "Silent Areas") can also enable a user to define one or more POIs or POI categories (e.g., medical, police, nightlife, etc.) as privacy sensitive areas.

Figure 4C:
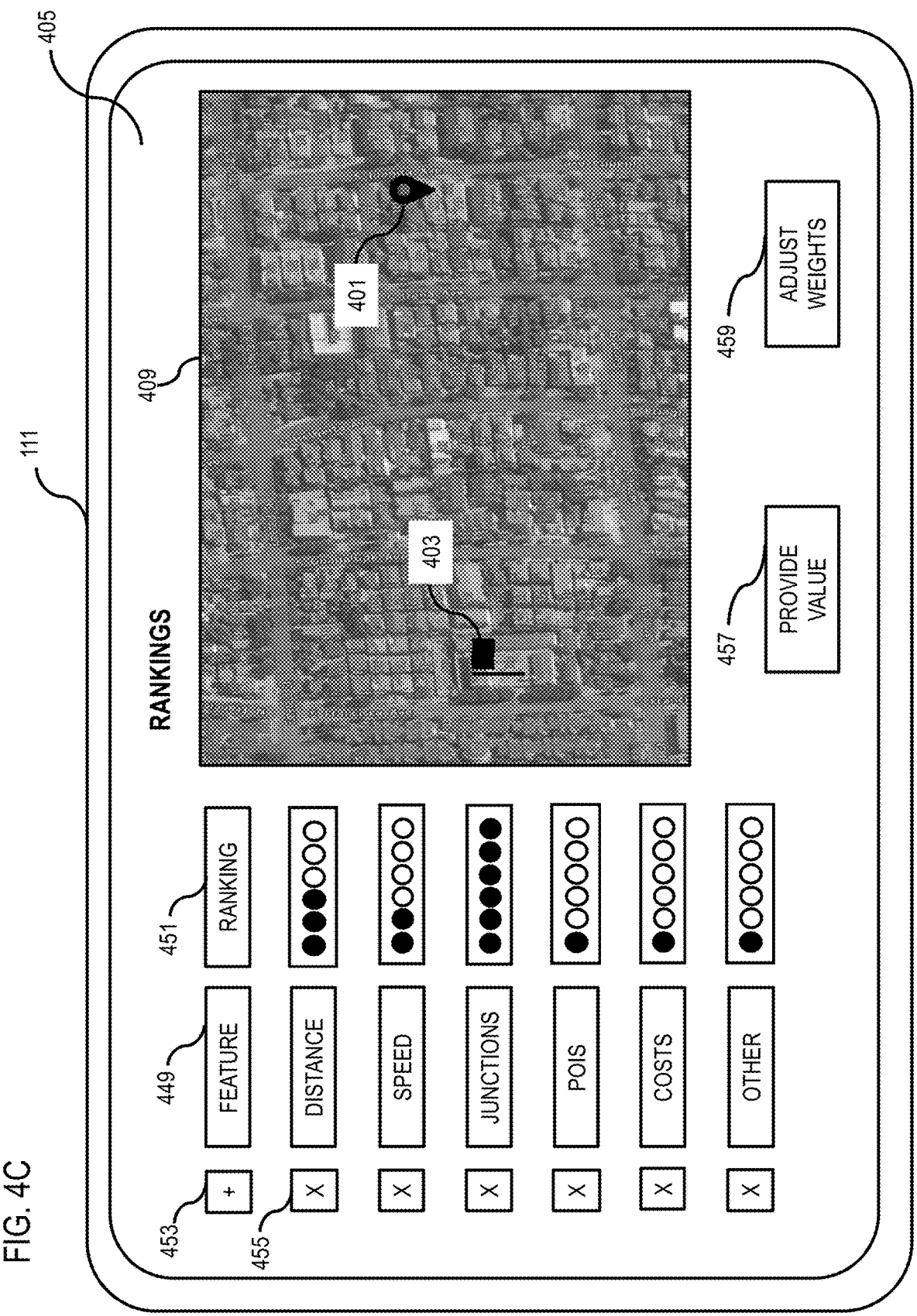

In one embodiment, the system 100 can generate the UI 405 such that it can enable a user to rank the features of the cropping heuristic on their impact on the user's perception of privacy. Referring to FIG. 4C, in one embodiment, the system can generate the UI 405 such that it includes one or more "features" inputs 449 (e.g., "Distance," "Speed," "Junctions," "POIs," "Costs," "Other," etc.) to enable a user to input or identify which of the one or more privacy-based features the user wants the system 100 to use in connection with the cropping algorithm and one or more "Ranking" inputs 451, which can enable a user to rank (e.g., by selecting between zero and a number of circles) the features of a cropping heuristic based on their impact on the user's perception of privacy. By way of example, the "features" may be one or more features of a trajectory, of a map, or a combination thereof. In this example, the user ranked the features in the following order: junctions, distance, speed, POIs, costs, and other. In one instance, the system 100 can generate the UI 405 such that it includes an input 453 (e.g., "+") that can enable a user to add one or more privacy-based features to the cropping heuristic and/or to the evaluation of the cropping heuristic as well as an input 455 (e.g., "X") that can enable a user to delete one or more features from the cropping algorithm or from the cropping heuristic evaluation.

In one instance, the system 100 can generate the UI 405 such that it includes an input 457 "Provide Value" that, given a cropping algorithm operates on some features, can enable a user to provide a desirable value for these features in terms of cropping (e.g., a distance from the start, minimum speed, number of map features such as junctions, POIs, signs, etc. from the start, where the trajectory should be cropped). In one example, an interaction with the input 457 can enable a user to toggle back to the UI 405 of FIG. 4A and/or FIG. 4B (e.g., to provide a value from where the trajectory must/should be cropped). In one embodiment, the system 100 can generate the UI 405 such that it includes an input 459 (e.g., "Adjust Weights") that can enable a user (e.g., a software developer) to adjust or modify the respective weights or weighting schemes used by the system 100 relative to the one or more features for determining the cropping heuristics and/or selecting the cropping heuristic from among a plurality of cropping heuristics to adjust the alignment between the cropping heuristic and a user's privacy preferences. In one instance, the machine learning system 109 can use the respective weights or weighting schemes set by the user using the inputs 459 in connection with the score or ranking of the cropping heuristics.

Figure 4D:
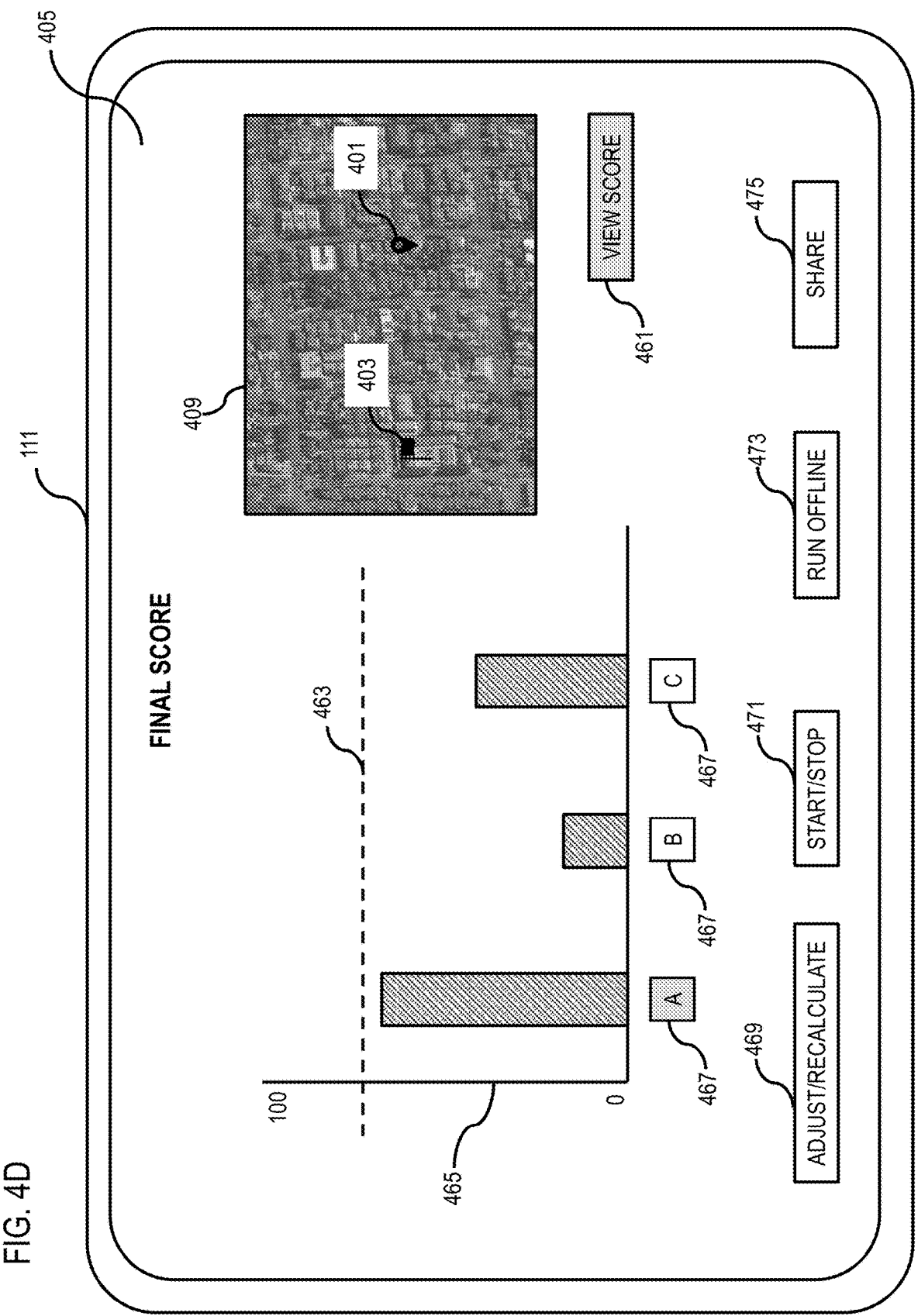

In one embodiment, the system 100 can generate the UI 501 such that it can enable a user to evaluate various heuristics as well perform various miscellaneous tasks. Referring to FIG. 4D ("Final Score"), in one embodiment, the system 100 can generate the UI 405 such that it includes an input 461 (e.g., "View Score") that can initiate the system 100's process of determining the "distance" between the output of the algorithm and the "desired output" 463 provided by the user-provided privacy preferences. In one instance, the system 100 can generate the UI 405 such that the score of each cropping heuristics (e.g., "A", "B", and "C") can be presented in the UI 405 by the chart 465. By way of example, the chart 465 can enable a user (e.g., software developer) to relatively easy determine which cropping heuristic among a set of candidates produces the output that is the closest to the user generated privacy preferences 463.

In one instance, the chart 465 may include a y-axis representing a degree of privacy from 0 to 100, for example, where "0" represents no privacy protection and "100" represents complete privacy. In this example, the cropping heuristic "A" appears to be the cropping heuristic of the set that is the most aligned with the user's privacy expectations as determined by the system 100 via the UI 405 in FIGS. 4A-4C. In one embodiment, the system 100 can generate the UI 405 such that it includes icons/inputs 467 (e.g., "A," "B," and "C") that can enable a user to select the particular cropping heuristic for implementation, as depicted by the highlighted input 467 (e.g., "A") or to learn more about the one or more features that comprise the heuristic. In one instance, the system 100 can generate the UI 405 such that it includes an input 469 (e.g., "Adjust/Recalculate") so that a user upon viewing the final score of the various cropping heuristics can toggle back to one or more previous iterations of the UI 405 to make one or more changes (e.g., via the UI 405 of FIG. 4A-4C) if so desired and then recalculate the final score. This functionality can be helpful for a software developer interested in learning how the various features, weights of such features, etc. may affect the overall score of a cropping heuristic.

In one embodiment, the system 100 can generate the UI 405 such that it includes an input 471 (e.g., "Start/Stop") that can enable a user (e.g., a driver of a vehicle 101) to disable the cropping of a probe trajectory. For example, the user may want to disable the cropping in an unknown or unfamiliar location wherein the user may want access to the most accurate LBS available in exchange for relatively no privacy protection. In another example, the user may want to disable the cropping, for example, where the cropping is being executed locally on the UE 111 (e.g., in the off-line scenario) to minimize one or more computation costs (e.g., battery, heat, etc.).

In one instance, the system 100 can generate the UI 405 such that it includes an input 473 (e.g., "Run Offline") to enable the system 100 to leverage map data, mobility pattern data, or a combination thereof during an offline mode of a UE 111 (e.g., an embedded navigation system, a mobile device, etc.). In one embodiment, as described above, when the system 100 is running in an offline mode, the system 100 can crop the probe trajectory (e.g., the probe trajectory 413) either before transmission (e.g., by the vehicle 101, a UE 111, or a combination thereof) or after the data is received by the system 100. For example, the user may want to use a UE 111 offline to minimize one or more computational costs and/or while a user may be located in area with minimal network connectivity (e.g., connection to the communication network 105) and/or during a time of potential network interference (e.g., during a severe weather storm). Also, as described above, in the case where the system 100 is running in an offline mode or scenario, the system 100 can cut both the start and the end of the probe trajectory as opposed to the on-line scenario where the system 100 often has difficulty cropping the end of the trajectory with relative accuracy in advance. In one instance, the system 100 can select the cropping heuristic (e.g., "A") while in off-line mode and then share the selected cropping heuristic with other users based on a user interaction with the input 475 (e.g., "Share") once the system 100 regains connectivity (e.g., with the communication network 105).

Returning to FIG. 1, in one embodiment, the vehicles 101 can be standard vehicles (e.g., a car), autonomous vehicles, HAD vehicles, semi-autonomous vehicles, etc. Although the vehicles 101 are depicted as automobiles, it is contemplated that the vehicles 101 can be any type of private, public, or shared manned or unmanned vehicle (e.g., cars, trucks, buses, vans, motorcycles, scooters, bicycles, drones, etc.) that can traverse a given area (e.g., the area 127).

In one embodiment, as previously stated, the vehicles 101 can be configured with one or more vehicle sensors 107 for generating or collecting probe data, sensor data, related geographic/map data (e.g., traffic data), etc. In one embodiment, the sensor data may be associated with a geographic location or coordinates at which the sensor data was collected (e.g., a latitude and longitude pair). In one embodiment, the probe data (e.g., stored in or accessible via the geographic database 115) includes location probes collected by one or more vehicle sensors 107, a UE 111 associated with a vehicle 101, or a combination thereof. By way of example, the vehicle sensors 107 may include a RADAR system, a LiDAR system, GPS sensor for gathering location data, a network detection sensor for detecting wireless signals or receivers for different short-range communications (e.g., Bluetooth, Wi-Fi, Li-Fi, NFC, etc.), temporal information sensors, a camera/imaging sensor for gathering image data, an audio recorder for gathering audio data, velocity sensors mounted on a steering wheel of the vehicles 101, switch sensors for determining whether one or more vehicle switches are engaged (e.g., driving lights on), and the like.

Other examples of vehicle sensors 107 may include light sensors, orientation sensors augmented with height sensors and acceleration sensors (e.g., an accelerometer can measure acceleration and can be used to determine orientation of the vehicle), tilt sensors to detect the degree of incline or decline of a vehicle 101 along a path of travel (e.g., the trajectory 413), moisture sensors, pressure sensors, etc. In a further example embodiment, vehicle sensors 107 about the perimeter of a vehicle 101 may detect the relative distance of the vehicle 101 from a physical divider, a lane line of a link or roadway, the presence of other vehicles, pedestrians, traffic lights, potholes, road signs or markers, and any other objects, or a combination thereof. In one scenario, the vehicle sensors 107 may detect contextually available information such as weather data, traffic information, or a combination thereof. In one embodiment, a vehicle 101 may include GPS or other satellite-based receivers 107 to obtain geographic coordinates from the satellites 125 for determining current location and time in relation to a user, a set of users, or a combination thereof. Further, the location can be determined by visual odometry, triangulation systems such as A-GPS, Cell of Origin, or other location extrapolation technologies.

In one embodiment, the UEs 111 (e.g., a mobile device, a smartphone, etc.) can be associated with a user such as a pedestrian walking or running in a given area (e.g., the area 127), a driver or passenger of vehicle 101, a software programmer, or a combination thereof. The UEs 111 can also be associated indirectly (e.g., a mobile device, a smartphone, etc.) or directly (e.g., an embedded navigation system) with a vehicle 101 traveling in a given area (e.g., the area 127). By way of example, the UEs 111 can be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with the vehicles 101 or any combination thereof, including the accessories and peripherals of these devices, or any combination thereof. It is also contemplated that a UE 111 can support any type of interface to the user (such as "wearable" circuitry, etc.). In one embodiment, the vehicles 101 may have cellular or wireless fidelity (Wi-Fi) connection either through the inbuilt communication equipment or from a UE 111 associated with the vehicles 101. Also, the UEs 111 may be configured to access the communication network 105 by way of any known or still developing communication protocols. In one embodiment, the UEs 111 may include the mapping platform 103 to evaluate heuristics for trajectory cropping.

In one embodiment, the UEs 111 can include device sensors 123 (e.g., GPS sensors, location sensors, a front facing camera, a rear facing camera, LiDAR sensors, sound sensors, height sensors, tilt sensors, moisture sensors, pressure sensors, wireless network sensors, etc.) and applications 113 (e.g., mapping application, navigation applications, data entry applications, communication applications, trajectory cropping applications, real-time traffic applications, POI-based applications, etc.). In one example embodiment, the GPS sensors 123 can enable the UEs 111 to obtain geographic coordinates from the satellites 125 for determining current or live location and time. Further, a user location within an area may be determined by a triangulation system such as A-GPS, Cell of Origin, or other location extrapolation technologies when cellular or network signals are available (e.g., during the off-line scenario).

In one embodiment, the mapping platform 103 performs the process for data-driven evaluation of heuristics for trajectory cropping as discussed with respect to the various embodiments described herein. In one embodiment, the mapping platform 103 can be a standalone server or a component of another device with connectivity to the communication network 105. For example, the component can be part of an edge computing network where remote computing devices (not shown) are installed along or within proximity of an intended destination (e.g., a city center).

In one embodiment, the machine learning system 109 of the mapping platform 103 can include a neural network or other machine learning system to tune and/or evaluate one or more heuristics for trajectory cropping. As described above, humans can use some kind of mental heuristic to determine what level of anonymization (e.g., cropping) is sufficiently private but these heuristics may vary across users and might not be entirely based on measurable criteria, so implementing these sort of heuristics directly in the algorithm run by the system 100 may be an inefficient use of resources. Additionally, different users might perceive privacy of the same trajectory differently (e.g., due to different knowledge of the environment). It is also problematic from a privacy perspective to ask a user to evaluate another user's trajectory, as that might reveal sensitive information about the creator of the trajectory. In one embodiment, the machine learning system 109 can tune the cropping heuristics (e.g., based on objective features that can be implemented) to resemble as much as possible the respective mental heuristics of users. In one instance, the machine learning system 109 can be used to compute a target speed, a target distance, a target number of one or more map features (e.g., junctions, intersections, traffic lights, street signs, homes, etc.), a target number of one or more POIs (e.g., businesses, venues, parks, POI density, etc.), or a combination thereof associated with one or more privacy-based features based on a user labeling of a reference trajectory at one or more trajectory points corresponding to different degrees of privacy (e.g., via a privacy questionnaire). In one instance, the machine learning system 109 can select or assign respective weights, correlations, relationships, etc. among the one or more heuristic-based features, the one or more privacy-based features, or a combination thereof in connection with the determining, selecting and/or ranking of cropping heuristics (e.g., stored in or accessible via the geographic database 115). For example, the machine learning system 109 can assign relatively greater weight to a threshold distance away from a location that the user wants to keep relatively private (e.g., a home) compared to a threshold time, which may be relatively more affected by one or more contextual parameters (e.g., traffic, weather, vehicle type, etc.), temporal parameters (e.g., time of day, day of week, etc.) and, therefore, is more like a constant temporal threshold, which can have negative implications as discussed above.

In one embodiment, the machine learning system 109 can iteratively improve the speed and accuracy by which the system 100 can tune a cropping heuristic to reflect the privacy preferences of a user (e.g., by determining where the system 100 should crop a trajectory); translate user-defined features into features that can be used in an algorithm by the system 100; evaluate or rank a cropping heuristic among or against a plurality of candidate cropping heuristics (e.g., stored in or accessible via the geographic database 115); or a combination thereof. In one embodiment, the neural network of the machine learning system 109 is a traditional convolutional neural network which consists of multiple layers of collections of one or more neurons (which are configured to process a portion of an input data). In one embodiment, the machine learning system 109 also has connectivity or access over the communication network 105 to the geographic database 115 that can store one or more labeled or marked heuristic-based features (e.g., speed, distance, number of map features, number of POIs, or a combination thereof at a start or an end of a cropped trajectory), privacy-based features (e.g., a target speed, a target distance, a target number of one or more map features, a target number of one or more POIs, etc.), or combination thereof.

In one embodiment, the mapping platform 103 has connectivity over the communications network 105 to the services platform 117 that provides the services 119. By way of example, the services 119 may include location-based services (e.g., real-time traffic information, fleet management, navigation), ranking and/or evaluation services, data collection services (e.g., probe data, privacy preference data, etc.), mapping services, navigation services, mobility services, autonomous or shared vehicle services, travel planning services, notification services, social networking services, content (e.g., audio, video, images, etc.), application update services, data storage services, contextual information determination services, information-based services (e.g., weather, news, etc.), etc. In one embodiment, the services platform 117 uses the output of the mapping platform 103 (e.g., a score, a ranking, or a combination thereof) to provide location-based services such as navigation and/or mapping, probe trajectory anonymization services, etc.

In one embodiment, the content providers 121 may provide content or data about a user (e.g., privacy preferences), historic mobility data (e.g., average, mean, etc.), contextual data (e.g., location, population density, type of vehicle 101, etc.), temporal data (e.g., time of day, day of week, weather, etc.), or a combination thereof for determining an applicable or relevant threshold speed, threshold distance, threshold number of one or more map features (e.g., junctions, intersections, traffic lights, street signs, homes, etc.), threshold number of one or more POIs (e.g., businesses, venues, parks, POI density, etc.) corresponding to a user's privacy-based preferences. The content providers 121 may also provide map data and attributes, road and lane attributes, traffic data (e.g., vehicle and pedestrian), parking-related data, event data, POI-based data mobility graphs, historical movement patterns, area population or density models, etc. to the vehicles 101, the mapping platform 103, the machine learning system 109, the UEs 111, the applications 113, the geographic database 115, the services platform 117, and the services 119. The content provided may be any type of content, such as map content, text-based content (e.g., statistical content), audio content, video content, image content, etc. In one embodiment, the content providers 121 may provide content regarding the movement of a vehicle 101, a UE 111, or a combination thereof on a digital map or link (e.g., corresponding to the area 127) as well as content that may aid in localizing a user path or trajectory on a digital map or link to assist, for example, with determining the location of a user relative to a relatively private location (e.g., a home, an office, a hospital, etc.). In one embodiment, the content providers 121 may also store content associated with the vehicles 101, the mapping platform 103, the UEs 111, the geographic database 115, the services platform 117, and/or the services 119. In another embodiment, the content providers 121 may manage access to a central repository of data, and offer a consistent, standard interface to data, such as a repository of the geographic database 115.

In one embodiment, a vehicle 101 (e.g., a standard vehicle, an autonomous vehicle, etc.) and/or a UE 111 (e.g., a mobile device) may be part of a probe-based system for collecting probe data to calculate a location of a vehicle 101, a user of a vehicle 101 (e.g., a driver or a passenger), a user associated with a UE 101, or a combination thereof relative to one or more relatively private or privacy sensitive locations (e.g., a home, an office, a hospital, etc.). In one embodiment, each vehicle 101 and/or UE 111 is configured to report probe data as probe points, which are individual data records collected at a point in time that records telemetry data for that point in time. In one embodiment, the probe ID can be permanent or valid for a certain period. In one embodiment, the probe ID is cycled, particularly for consumer-sourced data, to protect the privacy of the source.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 101 include vehicle sensors 107 (e.g., GPS sensors, LiDAR sensors, etc.) for reporting measuring and/or reporting attributes. The attributes can also be any attribute normally collected by an on-board diagnostic (OBD) system of the vehicles 101, and available through an interface to the OBD system (e.g., OBD II interface or other similar interface).

In one embodiment, the probe points can be reported from the vehicles 101 and/or the UEs 111 in real-time (e.g., in the on-line scenario), in batches, continuously, or at any other frequency requested by the system 100 over, for instance, the communication network 105 for processing by the mapping platform 103. In one instance, the vehicles 101 and/or the UEs 111 can transmit the probe points (e.g., via the communication network 105) after the trajectory is completed (e.g., in the off-line scenario). The probe points also can be map matched to specific road links stored in the geographic database 115. In one embodiment, the system 100 can generate user or vehicle 101 paths or trajectories from the observed and expected frequency of probe points for an individual probe so that the probe traces represent routes for all available transport modes, user historical routes, or a combination thereof through a given area (i.e., area specific mobility patterns).

In one embodiment, the UEs 111 may also be configured with various sensors (e.g., device sensors 123) for acquiring and/or generating probe data and/or sensor data associated with a user, a vehicle 101 (e.g., a driver or a passenger), other vehicles 101, or a combination thereof. For example, the device sensors 123 may be used as GPS receivers for interacting with the one or more satellites 125 to determine a user location, a user distance relative to an origin or a destination, a user speed relative to the origin or the destination, a number of map features (e.g., junctions, POIs, stop lights, etc.) passed since an origin or a destination, etc. In addition, the device sensors 123 can gather tilt data (e.g., a degree of incline or decline of a vehicle 101 during travel), motion data, light data, sound data, image data, weather data, temporal data, and other data associated with the vehicles 101 and/or the UEs 111. Still further, the device sensors 123 may detect a local or transient network and/or wireless signals (e.g., transaction information), such as those transmitted by nearby devices during navigation along a roadway (Li-Fi, NFC), etc.

It is noted therefore that the above-described data may be transmitted via the communication network 105 as probe data according to any known wireless communication protocols. For example, each user, vehicle 101, UE 111, and/or application 113 may be assigned a unique probe identifier (probe ID) for use in reporting or transmitting said probe data collected by the vehicles 101 and/or the UEs 111. In one embodiment, each vehicle 101 and/or UE 111 is configured to report probe data as probe points, which are individual data records collected at a point in time that records telemetry data.

In one embodiment, the mapping platform 103 retrieves aggregated probe points (e.g., probe trajectories) gathered and/or generated by the vehicle sensors 107 and/or the device sensors 123 at specific times resulting from the travel of the vehicles 101 and/or the UEs 111 on a road segment of a road network of a digital map space (e.g., corresponding to the area 127). In one instance, the geographic database 115 stores a plurality of probe points and/or trajectories generated by different vehicles 101, vehicle sensors 107, UEs 111, applications 113, device sensors 123, etc. over time. A time sequence of probe points specifies a trajectory—i.e., a path traversed by a vehicle 101, a UE 111, or a combination thereof over that time.

In one embodiment, the communication network 105 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for 5G New Radio (5G NR or simply 5G), microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the mapping platform 103 may be a platform with multiple interconnected components. The mapping platform 103 may include multiple servers, intelligent networking devices, computing devices, components, and corresponding software for providing parametric representations of lane lines. In addition, it is noted that the mapping platform 103 may be a separate entity of the system 100, included with a vehicle 101 (e.g., an embedded navigation system), a part of the services platform 117, or a part of the one or more services 119.

In one embodiment, the geographic database 115 can store information or data regarding one or more heuristic-based features (e.g., speeds, distance, a number of map features, number of POIs, or a combination thereof at a start or an end of the cropped trajectory); one or more privacy-based features (e.g., a target speed, a target distance, a target number of map features, number of POIs, or a combination thereof corresponding to respective user provided labels of a reference trajectory at one or more trajectory points corresponding to different degrees of privacy); one or more thresholds (e.g., a threshold speed, a threshold distance, a threshold number of map features, a threshold number of POIs, or a combination thereof) used by the system 100 for determining where a cropping heuristic should crop a probe trajectory. In one embodiment, the geographic database 115 can be in a cloud and/or in a vehicle 101, a UE 111, or a combination thereof.

By way of example, the vehicles 101, mapping platform 103, vehicle sensors 107, UEs 111, applications 113, services platform 117, services 119, content providers 121, device sensors 123, and/or satellites 125 communicate with each other and other components of the system 100 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 5:
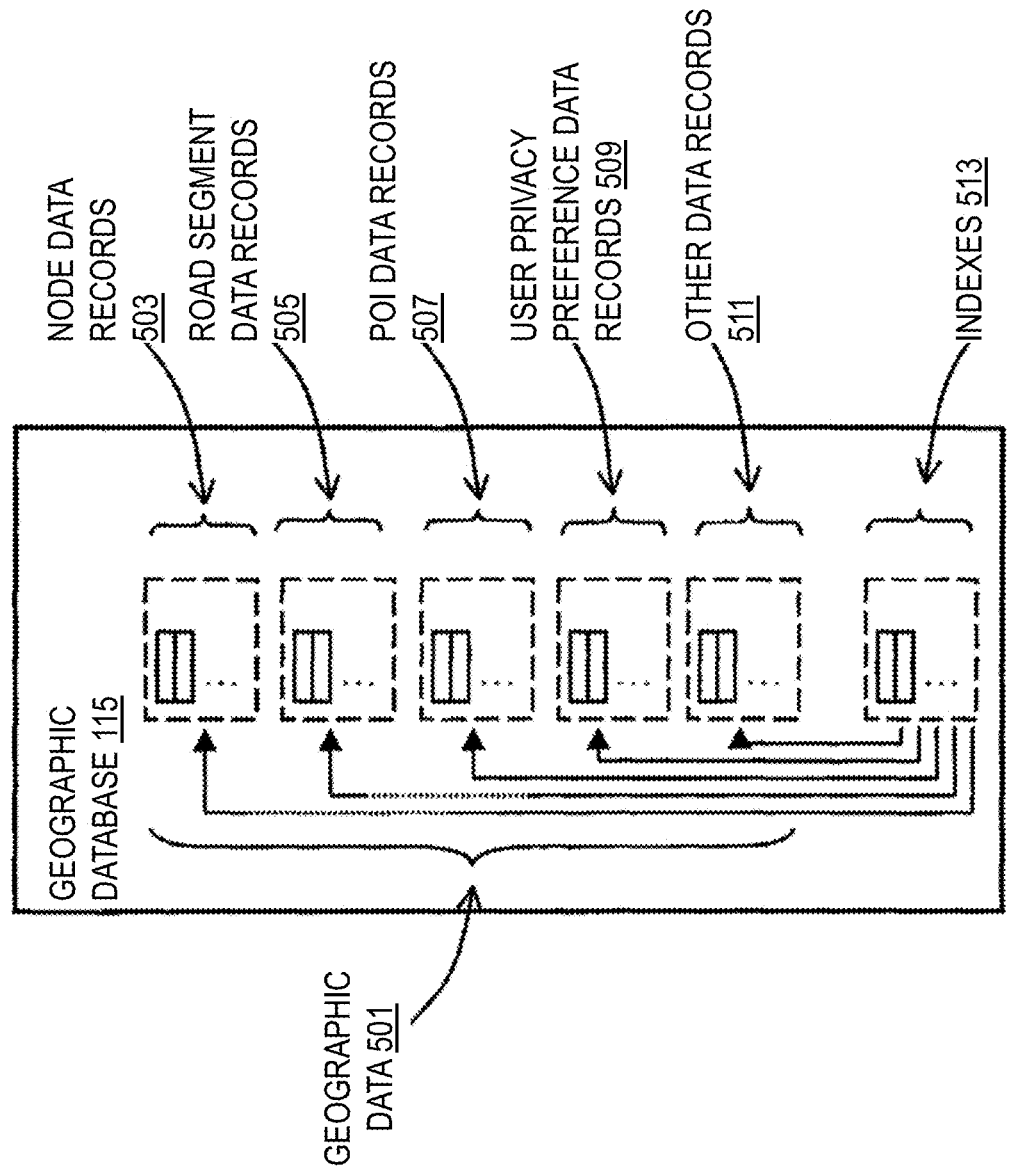
FIG. 5 is a diagram of a geographic database, according to example embodiment(s)

FIG. 5 is a diagram of a geographic database, according to example embodiment(s). In one embodiment, the geographic database 115 includes geographic data 501 used for (or configured to be compiled to be used for) a data-driven evaluation of heuristics for trajectory cropping. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 115.

"Node"—A point that terminates a link.

"Line segment"—A straight line connecting two points.

"Link" (or "edge")—A contiguous, non-branching string of one or more-line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon (e.g., a hexagon) is constructed from one outer simple polygon and none or at least one inner simple polygon. A polygon is simple if it just consists of one simple polygon, or complex if it has at least one inner simple polygon.

In one embodiment, the geographic database 115 follows certain conventions. For example, links do not cross themselves and do not cross each other except at a node. Also, there are no duplicated shape points, nodes, or links. Two links that connect each other have a common node. In the geographic database 115, overlapping geographic features are represented by overlapping polygons. When polygons overlap, the boundary of one polygon crosses the boundary of the other polygon. In the geographic database 115, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 115 includes node data records 503, road segment or link data records 505, POI data records 507, user privacy preference data records 509, other records 511, and indexes 513, for example. More, fewer, or different data records can be provided. In one embodiment, additional data records (not shown) can include cartographic ("carto") data records, routing data, and maneuver data. In one embodiment, the indexes 513 may improve the speed of data retrieval operations in the geographic database 115. In one embodiment, the indexes 513 may be used to quickly locate data without having to search every row in the geographic database 115 every time it is accessed. For example, in one embodiment, the indexes 513 can be a spatial index of the polygon points associated with stored feature polygons.

In exemplary embodiments, the road segment data records 505 are links or segments representing roads, streets, or paths (e.g., that are unique to an area) that can be used for evaluating heuristics for trajectory cropping. The node data records 503 are end points corresponding to the respective links or segments of the road segment data records 505. The road link data records 505 and the node data records 503 represent a road network, such as used by vehicles 113 and/or other entities. Alternatively, the geographic database 115 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as a restaurant, a retail shop, an office, etc. The geographic database 115 can include data about the POIs and their respective locations in the POI data records 507. In one embodiment, the POI data records 507 can include population density data, hours of operation, popularity or preference data, prices, ratings, reviews, and various other attributes. The geographic database 115 can also include data about places, such as cities, towns, or other communities, and other geographic features, such as bodies of water, mountain ranges, etc. Such place or feature data can be part of the POI data records 507 or can be associated with POIs or POI data records 507 (such as a data point used for displaying or representing a portion of a city).

In one embodiment, the geographic database 115 includes user privacy preference data records 509 associated with respective users providing probe trajectory data for use in connection with one or more LBS (e.g., real-time traffic information, fleet management, navigation, etc.). In one instance, the user privacy preference data records 509 can include marked or labeled probe trajectories that represent different degrees of user privacy. For example, the labels may include "Required Cropping" points where the trajectory must be cropped (i.e., any point before/after that point is too privacy revealing), "Desired Cropping" points where a user is most comfortable with the trajectory being cropped, or a combination thereof. In one instance, the user privacy preference data records 509 can include one or more user studies (e.g., based on an interactive experiment, a questionnaire, etc.) where users are presented with a visualization of an example trajectory (embedded in a map with relevant features) and are asked to preform various privacy preference determining tasks (e.g., define points, elaborate on decisions, define "silent points," rank features, provide a desirable value for where a trajectory should be cropped or where a cropping algorithm should crop (e.g., in a rural versus an urban area), etc.). In one instance, the user privacy preference data records 509 can include rankings, weights, or weighting schemes, labeled and/or marked features and attributes (e.g., for use in connection with the machine learning system 109), and/or any other related data. In one embodiment, the user privacy preference data records 509 can be associated with one or more of the node data records 503, road segment or link records 505, and/or POI data records 507; or portions thereof (e.g., smaller or different segments than indicated in the road segment records 505) to enable data-driven evaluation of heuristics for trajectory cropping.

In one embodiment, the geographic database 115 can be maintained by the services platform 117 (e.g., a map developer). The map developer can collect human movement data to generate and enhance the geographic database 115. There can be different ways used by the map developer to collect data. These ways can include obtaining data from other sources, such as municipalities or respective geographic authorities. In addition, the map developer can employ field personnel to travel by a vehicle 101 along roads throughout an area of interest (e.g., the area 127) to observe and/or record probe trajectory data (e.g., speed, distance, etc.). Similarly, the map developer can employ field personnel to travel by foot throughout an area of interest (e.g., the area 127) to observe or catalogue information about user privacy preferences (e.g., via an interactive experiment, questionnaire, or survey). Also, remote sensing, such as aerial or satellite photography, can be used. Again, it should be noted that all data should be collected and processed in a privacy compliant way as much of this data related to people's identities, movements, locations and failure to consider such factors might lead to a loser of user trust.

In one embodiment, the geographic database 115 include high resolution or high definition (HD) mapping data that provide centimeter-level or better accuracy of map features. For example, the geographic database 115 can be based on LiDAR or equivalent technology to collect billions of 3D points and model road surfaces and other map features down to the number lanes and their widths. In one embodiment, the HD mapping data capture and store details such as the slope and curvature of the road, lane markings, roadside objects such as signposts, including what the signage denotes. By way of example, the HD mapping data enable highly automated vehicles 113 to precisely localize themselves on a road, and to determine the road attributes (e.g., direction of traffic) at high accuracy levels.

In one embodiment, the geographic database 115 is stored as a hierarchical or multi-level tile-based projection or structure. More specifically, in one embodiment, the geographic database 115 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 115 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101, a vehicle sensor 107, a UE 111, and/or a device sensor 123. The navigation-related functions can correspond to vehicle navigation (e.g., autonomous navigation), pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for evaluating heuristics for trajectory cropping may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
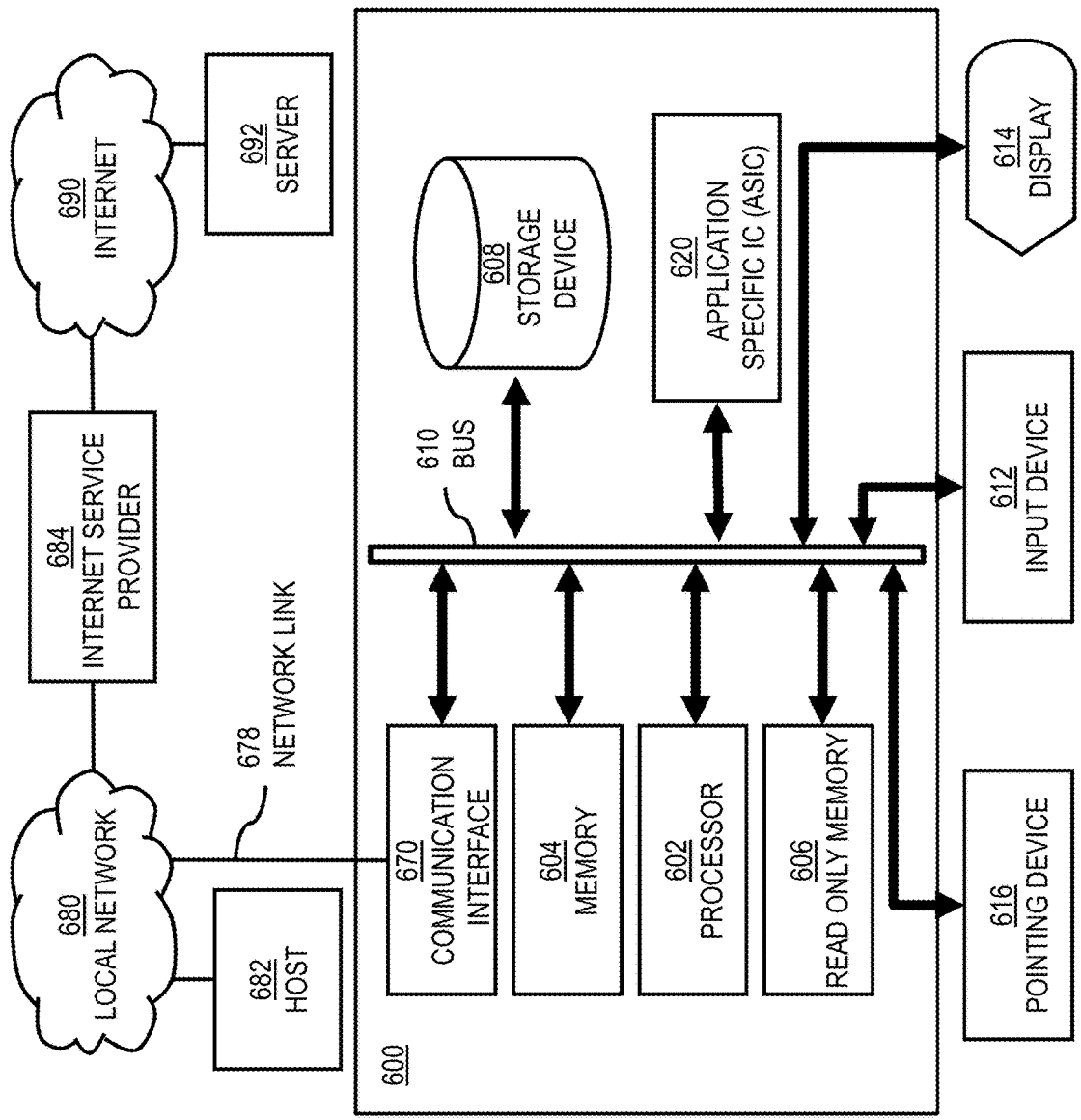
FIG. 6 is a diagram of hardware that can be used to implement example embodiment(s)

FIG. 6 illustrates a computer system 600 upon which example embodiment(s) of the invention may be implemented. Computer system 600 is programmed (e.g., via computer program code or instructions) to evaluate heuristics for trajectory cropping as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 610 includes one or more parallel conductors of information so that information is transferred quickly among devices coupled to the bus 610. One or more processors 602 for processing information are coupled with the bus 610.

A processor 602 performs a set of operations on information as specified by computer program code related to evaluating heuristics for trajectory cropping. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random-access memory (RANI) or other dynamic storage device, stores information including processor instructions for evaluating heuristics for trajectory cropping. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for evaluating heuristics for trajectory cropping, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners, and external disks. In general, the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic, or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for evaluating heuristics for trajectory cropping.

The term computer-readable medium is used herein to refer to any medium that participates in providing information to processor 602, including instructions for execution. Such a medium may take many forms, including, but not limited to, non-volatile media, volatile media, and transmission media. Non-volatile media include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system can be deployed in various configurations within other computer systems, e.g., host 682 and server 692.

FIG. 7 illustrates a chip set 700 upon which example embodiment(s) of the invention may be implemented. Chip set 700 is programmed to evaluate heuristics for trajectory cropping as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively, or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to evaluate heuristics for trajectory cropping. The memory 705 also stores the data associated with or generated by the execution of the inventive steps.

FIG. 9 is a diagram of exemplary components of a mobile terminal 901 (e.g., a UE 101, a vehicle 113, or a component thereof) capable of operating in the system of FIG. 1, according to example embodiment(s). Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions that offer automatic contact matching. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile station 901 to evaluate heuristics for trajectory cropping. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 951 may be, but not limited to, a single memory, CD, DVD, ROM, RAM, EEPROM, optical storage, or any other non-volatile or non-transitory storage medium capable of storing digital data.

An optionally incorporated SIM card 949 carries, for instance, important information, such as the cellular phone number, the carrier supplying service, subscription details, and security information. The SIM card 949 serves primarily to identify the mobile station 901 on a radio network. The card 949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining a cropping heuristic, wherein the cropping heuristic comprises an algorithm for cropping a probe trajectory collected from one or more sensors of a mobile device to anonymize probe trajectory data;
   processing the probe trajectory using the cropping heuristic to generate a cropped probe trajectory;
   extracting one or more heuristic-based features of the cropped probe trajectory data, wherein the one or more heuristic-based features represent an achieved cropping of the probe trajectory data resulting from the cropping heuristic;
   extracting one or more privacy-based features from a privacy preference, wherein the one or more privacy-based features represent a target level of cropping to meet the privacy preference;
   computing a score based on a distance between the one or more heuristic-based features and the one or more privacy-based features; and
   providing the score as an output.

2. The method of claim 1, further comprising:
   selecting the cropping heuristic from among a plurality of cropping heuristics based on the score; and
   initiating a configuration of the cropping heuristic in a device based on the selecting.

3. The method of claim 2, wherein the selecting of the cropping heuristic is further based on one or more other scores representing a utility, a computation cost, or a combination thereof of the plurality of cropping heuristics.

4. The method of claim 1, wherein the distance between the one or more heuristic-based features and the one or more privacy-based features is based on a number of probe points of the cropped probe trajectory within the target level of cropping, outside the target level of cropping, or a combination thereof.

5. The method of claim 1, further comprising:
   ranking the cropping heuristic among a plurality of cropping heuristics based on the score,
   wherein the output further comprises the ranking.

6. The method of claim 1, wherein the cropping heuristic crops the probe trajectory based on a threshold speed, a threshold distance, a threshold number of one or more map features, a threshold number of one or more points of interest, or a combination thereof.

7. The method of claim 1, further comprising:
   receiving a user input that labels a reference trajectory at one or more trajectory points corresponding to different degrees of privacy,
   wherein the privacy preference is based on the user input.

8. The method of claim 7, wherein the target level of cropping is based on the one or more trajectory points of the reference trajectory.

9. The method of claim 7, wherein the one or more privacy-based features include a target speed, a target distance, a target number of one or more map features, a target number of one or points of interest, or a combination thereof corresponding to the one or more trajectory points.

10. The method of claim 9, further comprising:
providing the one or more trajectory points as an input to a machine learning model to compute the target speed, the target distance, the target number of one or more map features, the target number of points of interest, or a combination thereof.

11. The method of claim 1, wherein the extracting of the one or more privacy-based features comprises parsing user privacy questionnaire data to determine the privacy preference, the one or more privacy-based features, or a combination thereof.

12. The method of claim 1, wherein the one or more heuristic-based features include a speed, a distance, a number of one or more map features, a number of one or more points of interest, or a combination thereof at a start or an end of the cropped trajectory.

13. An apparatus comprising:
at least one processor; and
at least one memory including computer program code for one or more programs,
the at least one memory and the computer program code configured to, with the at least one processor, cause the apparatus to perform at least the following,
receive a request to initiate a transmission of real-time probe trajectory data;
determine a privacy preference associated with the probe trajectory data;
select a cropping heuristic based on a score associated with a cropping metric, wherein the score represents a capability of the cropping metric to achieve a target cropping level to meet the privacy preference;
determine a start parameter for initiating the transmission based on the cropping heuristic; and
initiate the transmission of the real-time probe trajectory data based on the start parameter.

14. The apparatus of claim 13, wherein the start parameter indicates a speed, a distance, a number of one or more map features, a number of one or more points of interest, or a combination thereof at which the transmission is to be initiated.

15. The apparatus of claim 13, wherein the apparatus is further caused to:
extract one or more privacy-based features from the privacy preference,
wherein the start parameter is determined based on the one or more privacy-based features; and
wherein the one or more privacy-based features include a target speed, a target distance, a target number of one or more map features, a target number of one or more points of interest, or a combination thereof corresponding to the target level of cropping.

16. The apparatus of claim 13, wherein the cropping heuristic is selected from a plurality of cropping heuristics based on the score.

17. A non-transitory computer readable storage medium including one or more sequences of one or more instructions which, when executed by one or more processors, cause an apparatus to at least perform:
receiving a request to initiate a transmission of a probe trajectory from a mobile device;
determining a privacy preference associated with the mobile device, a user of the mobile device, the probe trajectory, or a combination thereof;
selecting a cropping heuristic based on a score associated with a cropping metric, wherein the score represents a capability of the cropping metric to achieve a target cropping level to meet the privacy preference;
determining a start parameter, an end parameter, or a combination thereof for initiating the transmission based on the cropping heuristic; and
initiating the transmission of the probe trajectory based on the start parameter, the end parameter, or a combination thereof.

18. The non-transitory computer readable storage medium of claim 17, wherein the start parameter indicates a start speed, a start distance, a start number of one or more map features, a start number of one or more points of interest, or a combination thereof at which the transmission is to be initiated; and wherein the end parameter indicates an end speed, an end distance, an end number of one or more map features, an end number of one or more points of interest, or a combination thereof at which the transmission is to be terminated.

19. The non-transitory computer readable storage medium of claim 17, wherein the apparatus is caused to further perform:
extracting one or more privacy-based features from the privacy preference,
wherein the start parameter, the end parameter, or a combination thereof is determined based on the one or more privacy-based features; and
wherein the one or more privacy-based features include a target speed, a target distance, a target number of one or more map features, a target number of points of interest, or a combination thereof corresponding to the target level of cropping.

20. The non-transitory computer readable storage medium of claim 17, wherein the cropping heuristic is selected from a plurality of cropping heuristics based on the score.

* * * * *